United States Patent [19]

Gilham et al.

[11] Patent Number: 4,481,604

[45] Date of Patent: Nov. 6, 1984

[54] POSTAL METER USING MICROCOMPUTER SCANNING OF ENCODING SWITCHES FOR SIMULTANEOUS SETTING OF ELECTRONIC ACCOUNTING & MECHANICAL PRINTING SYSTEMS

[75] Inventors: Dennis T. Gilham, Ongar; Thomas D. Williams, Billericay; Manickam Ananthan, London; William J. Herring, Dagenham, all of England

[73] Assignee: Roneo Alcatel Limited, Romford, England

[21] Appl. No.: 280,871

[22] Filed: Jul. 6, 1981

[30] Foreign Application Priority Data

Jul. 9, 1980 [GB] United Kingdom ................. 8022527

[51] Int. Cl.[3] ....................... G06F 15/20; G06F 13/06; G06F 15/02; G06F 3/02

[52] U.S. Cl. ....................................... 364/900; 101/91; 364/464

[58] Field of Search ............... 364/364, 200, 900, 464; 101/91

[56] References Cited

U.S. PATENT DOCUMENTS

| | | | |
|---|---|---|---|
| 4,246,643 | 1/1981 | Hubbard | 364/900 |
| 4,271,481 | 6/1981 | Check, Jr. et al. | 364/900 |
| 4,280,179 | 7/1981 | Jones, Jr. et al. | 364/464 |
| 4,280,180 | 7/1981 | Eckert et al. | 364/464 |
| 4,286,325 | 8/1981 | Dlugos et al. | 364/466 |
| 4,301,507 | 11/1981 | Soderberg et al. | 364/464 |
| 4,313,105 | 1/1982 | Ananthan et al. | 340/825.56 |
| 4,326,254 | 4/1982 | Uchimura et al. | 364/466 |
| 4,331,075 | 5/1982 | Williams | 101/91 |

*Primary Examiner*—James D. Thomas
*Assistant Examiner*—A. E. Williams, Jr.
*Attorney, Agent, or Firm*—Shoemaker and Mattare, Ltd.

[57] ABSTRACT

An entire electronic accounting and controlling system for a franking machine is mounted on two connected printed circuit boards, one along the top of the machine and the other along one side of the machine within the machine casing. The top board carries four rotary encoding switches and press button switches which are scanned by signals from a microcomputer on the side board passing to a binary counter controlling a binary to decimal decoder to send multiplexed signals to the switches enabling the rotary switches to send four pairs of five-bit words along ten scanning lines to the microcomputer which delivers equivalent eight-bit error immune signals to duplicate non-volatile memories. The press button switches send signals along the scanning lines to enable a display module on the top board to display decimal digits according to the information stored in the memories. A printing drum is set mechanically simultaneously with the rotary switches. When a sealed door in the casing is opened a switch is automatically actuated to change over from customer mode to Post Office mode.

21 Claims, 20 Drawing Figures

FLAGS

E1 – Fault in memory 1.
E2 – " " " 2.
IF – Input module fault.
IT – Input module transitionary state.
DC – Self check fault.
SW – Account switch fault.
HV – " bank at non-zero.
C1 – Credit ≤ 50.000 units.
C2 – " " 10.000 "
C3 – " " 1.000 "
RΘ – Drum rotation.
SA – Account switches in differing states.
AK – Status of high value key.
WS – Weigh scale mode.
CD – Credit display "
TD – Tote " "
PD – Items " "
DT – Display test "
KB – Keyboard in use.
AP – Account operation in progress.
FN – Upper key function select.
CS – Status of P.O. switch.
FT – Fault mode
EQ – Weigh scale value equals thumbwheel value.
CP – Power fail capacitor C2 or C3.
TO – Tote meter locked.
JF – Verification of account switch operation in response to trip issue.
RL – Restricted last digit i.e. 0.5 only.
SM – Single meter.
CI – Customers items counter.
PI – P.O. " "
LM – Locking tote meter.
LO – Locked " "

FIG. 15

POSTAL METER USING MICROCOMPUTER SCANNING OF ENCODING SWITCHES FOR SIMULTANEOUS SETTING OF ELECTRONIC ACCOUNTING & MECHANICAL PRINTING SYSTEMS

FIELD OF THE INVENTION

This invention relates to postal franking meters for franking machines.

In a franking meter a value has to be set for each item of mail fed into the machine. This value, which in the United Kingdom is usually up to 999¾, can be altered as required by hand. This value is automatically communicated to a mechanism that prints on items of mail an inked franking impression in accordance with the requirements laid down by International Post Offices. The value is also automatically communicated to an accounting side of the meter, including a descending register containing the sum of postage value remaining credited for the customer and an ascending register containing the accumulated sum of postage value used.

DESCRIPTION OF THE PRIOR ART

It will be appreciated that the accounting and control side of the meter can be basically an electronic system while the value setting may be electromechanical or mechanical and the printing system essentially mechanical. There have been prior proposals comprising such electronic and mechanical systems. In one of these the electronic system comprises a microcomputer and various ancillary solid state units. On the mechanical side, the values are set by press buttons and printing wheels allocated respectively to several numerical orders are set selectively by a stepping motor according to the values to be franked. The stepping motor is selectively connected to the printing wheels under the control of solenoids. This, although having benefits in some applications, involves an electromechanical system of substantial complexity and cost.

A more simple mechanical system has been proposed wherein the press buttons are replaced by thumb wheels as currently used in many mechanical franking machines each geared permanently to a corresponding one of the printing wheels by way of an individual drive bar in an arbor carrying a printing drum wherein the printing wheels are mounted. In this proposal, however, the values selected by the thumb wheels are communicated to an electronic accounting system by way of the drive bars which act on the accounting system through magnetoresistive cells only when the arbor is caused to rotate to effect a printing operation. Thus, monitoring procedures such as checks and fault diagnostics cannot be effected in relation to an input value before the actual printing of the value begins. Moreover, the input to the accounting system by the rotary printing assembly prevents the use of a satisfactory modular arrangement such that substantially all the electronic parts can be located on printed circuit boards mounted conveniently and independently of the mechanical parts and minimizing the weight and bulk of that portion of the meter.

SUMMARY OF THE INVENTION

A primary object of the invention is to provide a franking meter having an electronic accounting system and a mechanical printing system in which each value to be franked is set simultaneously in the two systems by means that are substantially more simple, economically constructed and more readily serviced than in the case of the aforesaid prior proposals and at the same time enable substantially the whole of the electronic accounting system to be mounted on printed circuit boards occupying only a comparatively small portion of the bulk of the postal franking meter.

It will be appreciated that a postal franking meter is that part of a franking machine that has to be periodically carried to a post office for replenishment of credit. The base of the machine comprises the mechanism for feeding the items of mail through the machine to receive the franked impressions. For smaller basic postal franking machines the meter and base may be a single integral unit.

According to the invention a postal franking meter for a franking machine comprises a plurality of printing members allocated respectively to the numerical orders of the maximum value to be franked by the machine, each printing member being adjustable for printing any one of a series of digits (or fractions), manually operable elements respectively mechanically connected to said printing members for setting said printing members to print required values, a printed circuit board assembly comprising solid state units, including a microcomputer for effecting substantially all accounting operations required in the machine, said operations including registering descending values remaining credited for a customer and registering ascending values of postal value used, an alphanumeric display module for displaying information and values when required, said printed circuit board assembly comprising stationary arrays of conductors serving as encoding switch contacts, said arrays being allocated respectively to said printing members for encoding numerical values to be printed thereby, rotatable encoding switch contact units mounted directly on said board assembly for traversing said stationary contacts in said arrays to select the values to be encoded, and mechanical means connecting said rotatable switch contact units to said manually operable elements whereby the operation of any said element simultaneously sets the associated printing member to a value to be printed and encodes that value.

Preferably the manually operable elements are thumb wheels and the printing elements are printing wheels, each thumb wheel being connected by a first rack and gear mechanism to the associated printing wheel and by a second rack and gear mechanism to a rotatable contact unit for encoding each value selected for printing by the associated printing wheel. The fact that the stationary switch contacts are integral with a circuit board and the rotatable contact units are mounted directly on this board means that a particularly neat arrangement can be devised, separately mounted encoding switches and corresponding connections being eliminated thereby reducing cost and improving reliability. For example, there may be a printed circuit board carrying the encoding switch contacts in addition to press button switches for controlling an alphanumeric display, this board being located along the top of the meter and connected, for example, by a flexible printed circuit or other connecting means to a second printed circuit board along one side of the meter and including the microcomputer, a memory module and associated solid state units, or the whole circuit on one pcb.

In a franking meter, it is necessary to provide means for changing over from a customer mode, that is to say a normal mode of action under control of the user of the machine, to a post office mode enabling a postal authority to adjust and reset the meter, in particular to alter the credit available to the user as registered in the memory module. For this purpose, it is advantageous to provide the meter with a casing having a door that has been sealed by a postal authority, but when opened by the authority automatically actuates a switch to change the meter from the customer mode to the post office mode and at the same time exposes a press button to be used in resetting the meter.

DESCRIPTION OF THE DRAWINGS

In order that the invention may be clearly understood and readily carried into effect a postal franking meter in accordance therewith will now be described, by way of example, with reference to the accompanying drawings, in which:

FIG. 15 is a chart showing a flag bank arrangement for a memory system;

DESCRIPTION OF PREFERRED EMBODIMENTS

Figure 1:
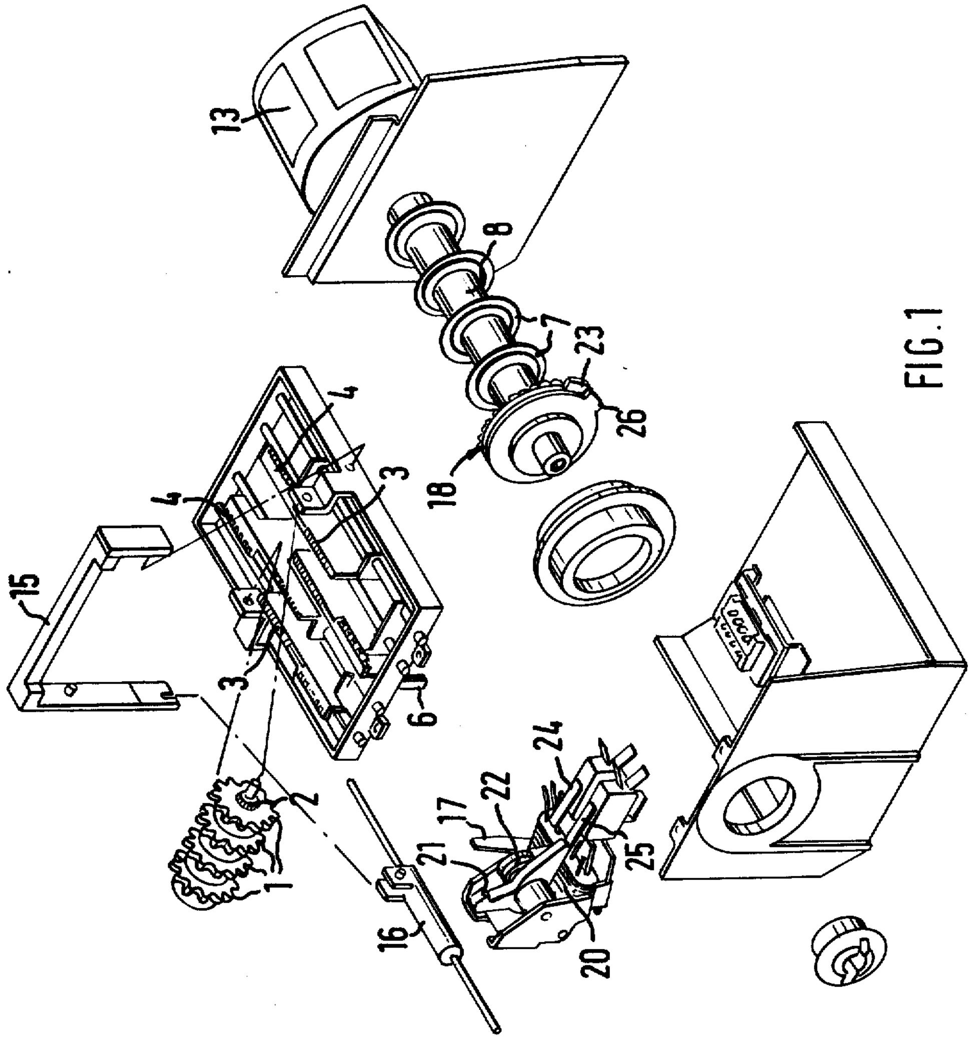
FIG. 1 is an exploded view showing portions of a value selector mechanism and printing mechanism.
Figure 2:
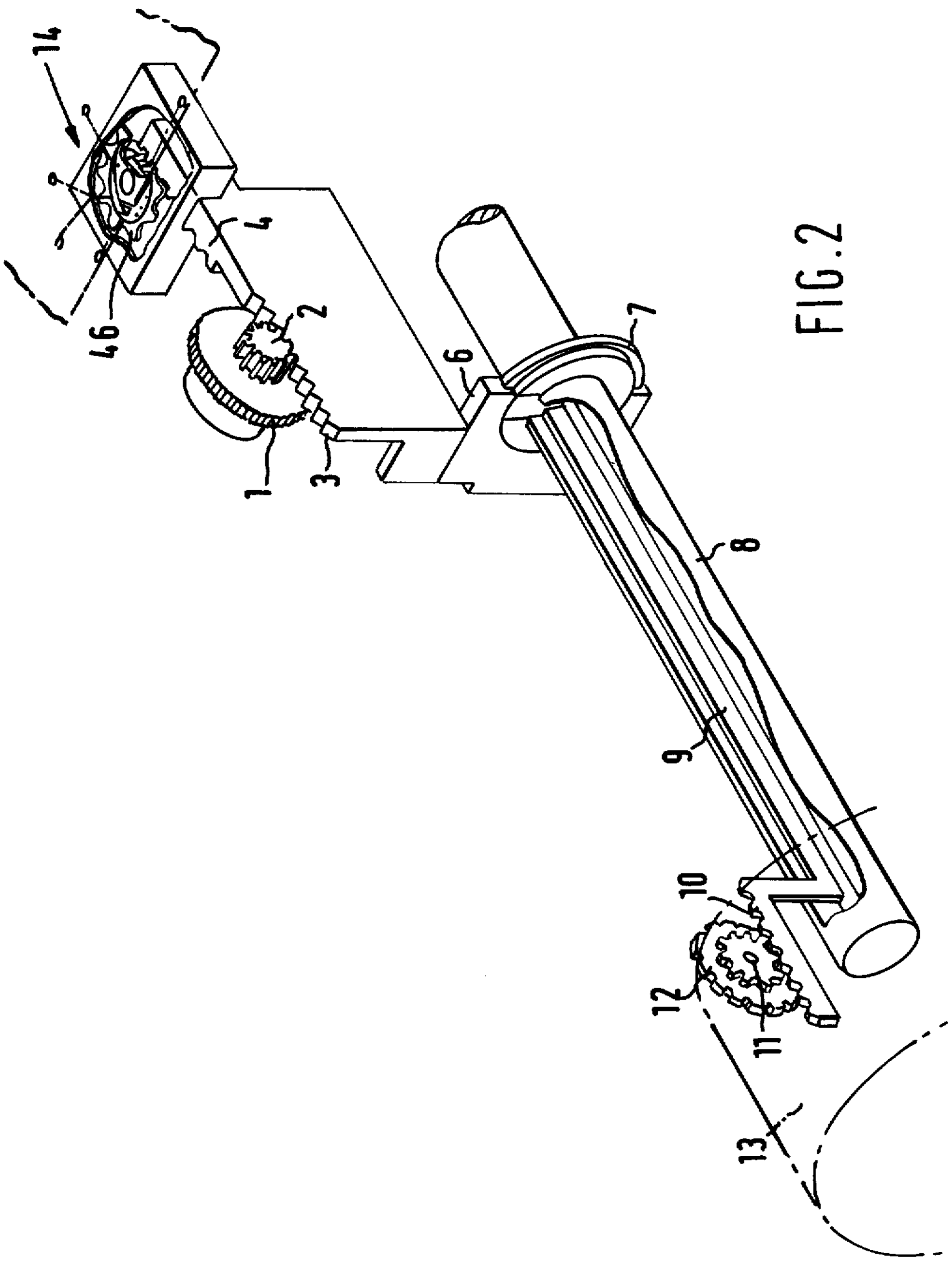
FIG. 2 is a perspective view showing details of parts of the mechanism of FIG. 1.

Referring to FIGS. 1 to 4, the postage value to be franked is selected by manually rotating a selection of four thumb wheels 1 to the required value, the thumb wheels being allocated respectively to the four numerical orders contained in the largest value to be franked and each order comprising the digits (or fractions) that may be required to be printed for that order. Each thumb wheel 1 has an integral gear 2 which meshes with a corresponding rack 3. Rotation of the thumb wheel causes a fore and aft movement of the rack 3. Integral with each thumb wheel rack 3 is a second rack 4 which engages a gear 5 that forms part of an associated one of four encoding switches 14 described below. Actuation of this encoding switch provides the appropriate value input to an electronic accounting portion of the machine. Integral also with each thumb wheel rack 3 is a value selector ring shoe 6 which shrouds and is capable of imparting axial movement to an associated one of four selector rings 7 that can slide along an arbor 8 under the control of the associated thumb wheel 1. Each selector ring 7 is fixed to a bar 9 that can slide longitudinally in a slot in the arbor 8 and carries a rack 10 in mesh with a gear 11 fixed to a printing wheel 12 in a printing drum 13. Thus rotation of a value selection thumb wheel causes a synchronised operation of the corresponding encoding switch and of the corresponding value printing wheel which subsequently prints the appropriate value onto the mail.

Figure 3:
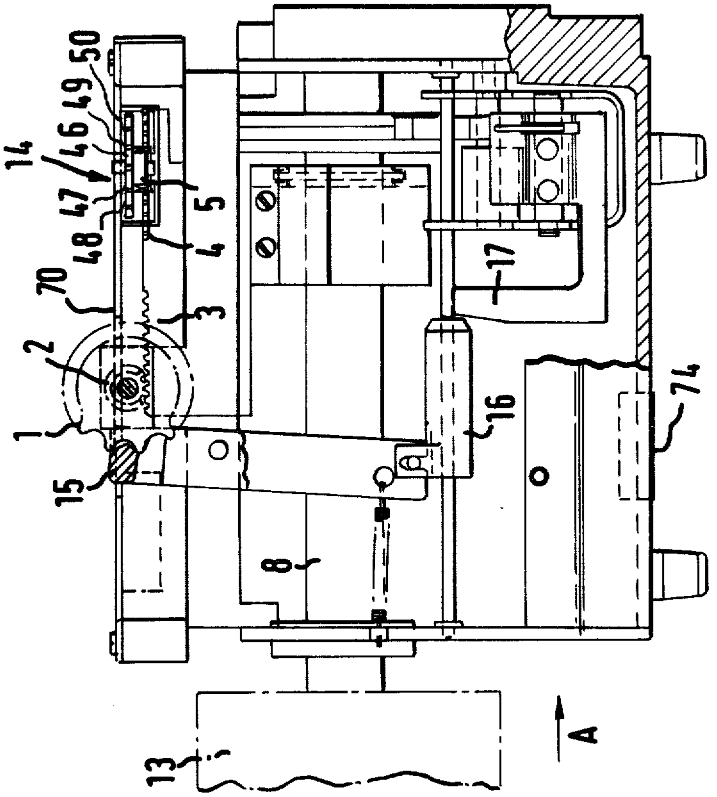
FIG. 3 is a vertical section through the postal franking meter.
Figure 10:
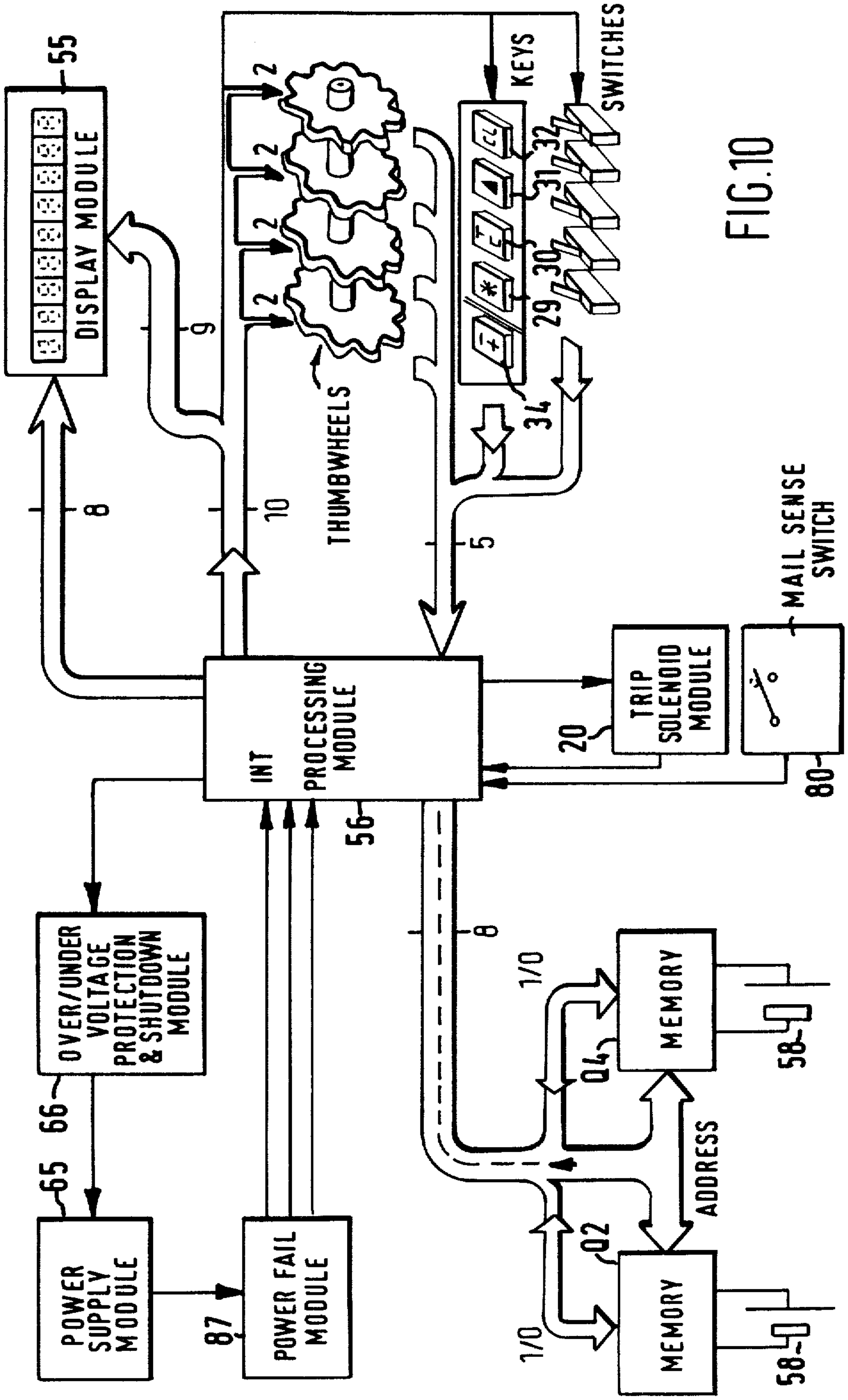
FIG. 10 is a system block diagram.
Figure 11A:
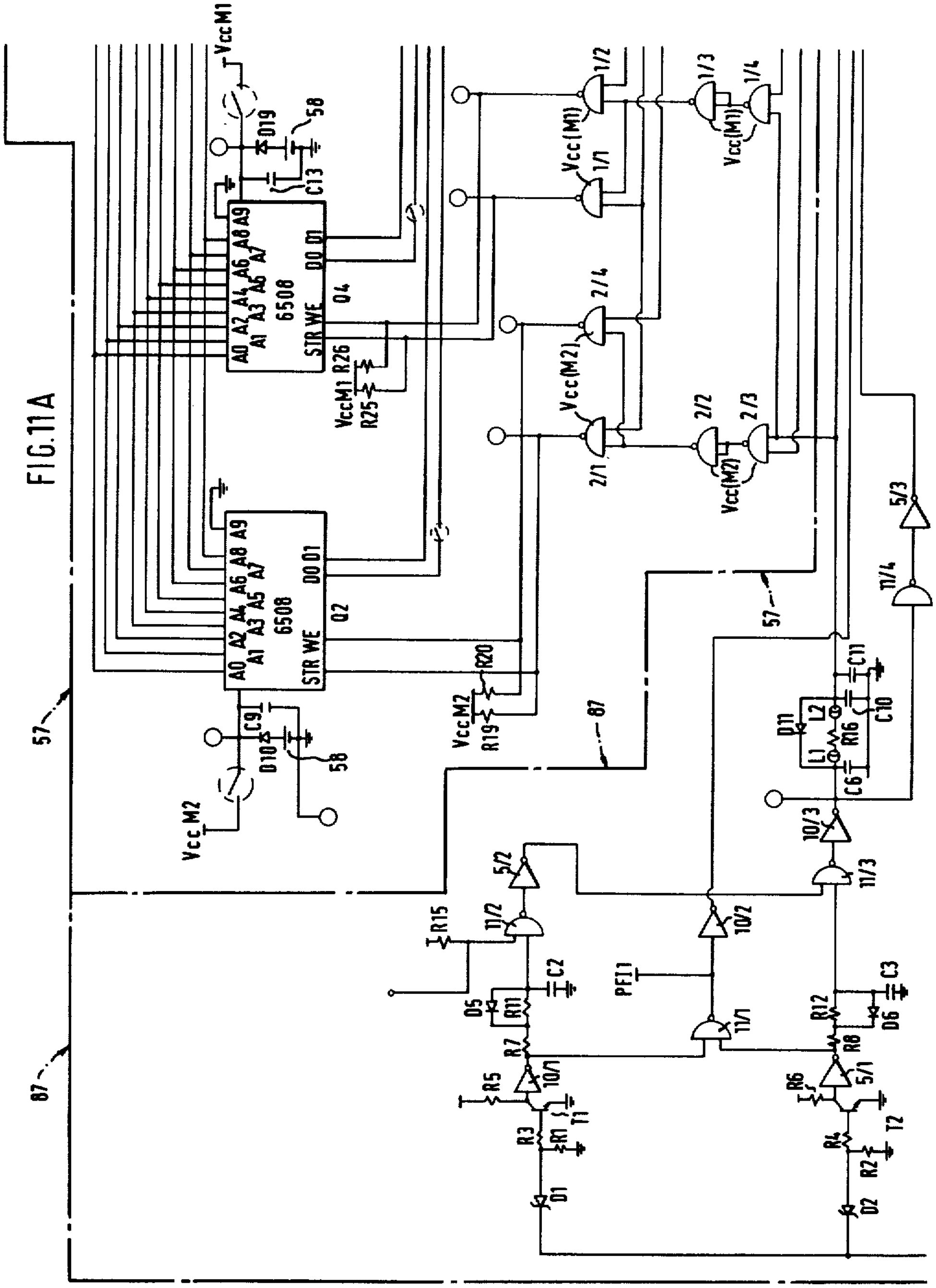
FIGS. 11A-11D are circuit diagrams.
Figure 11B:
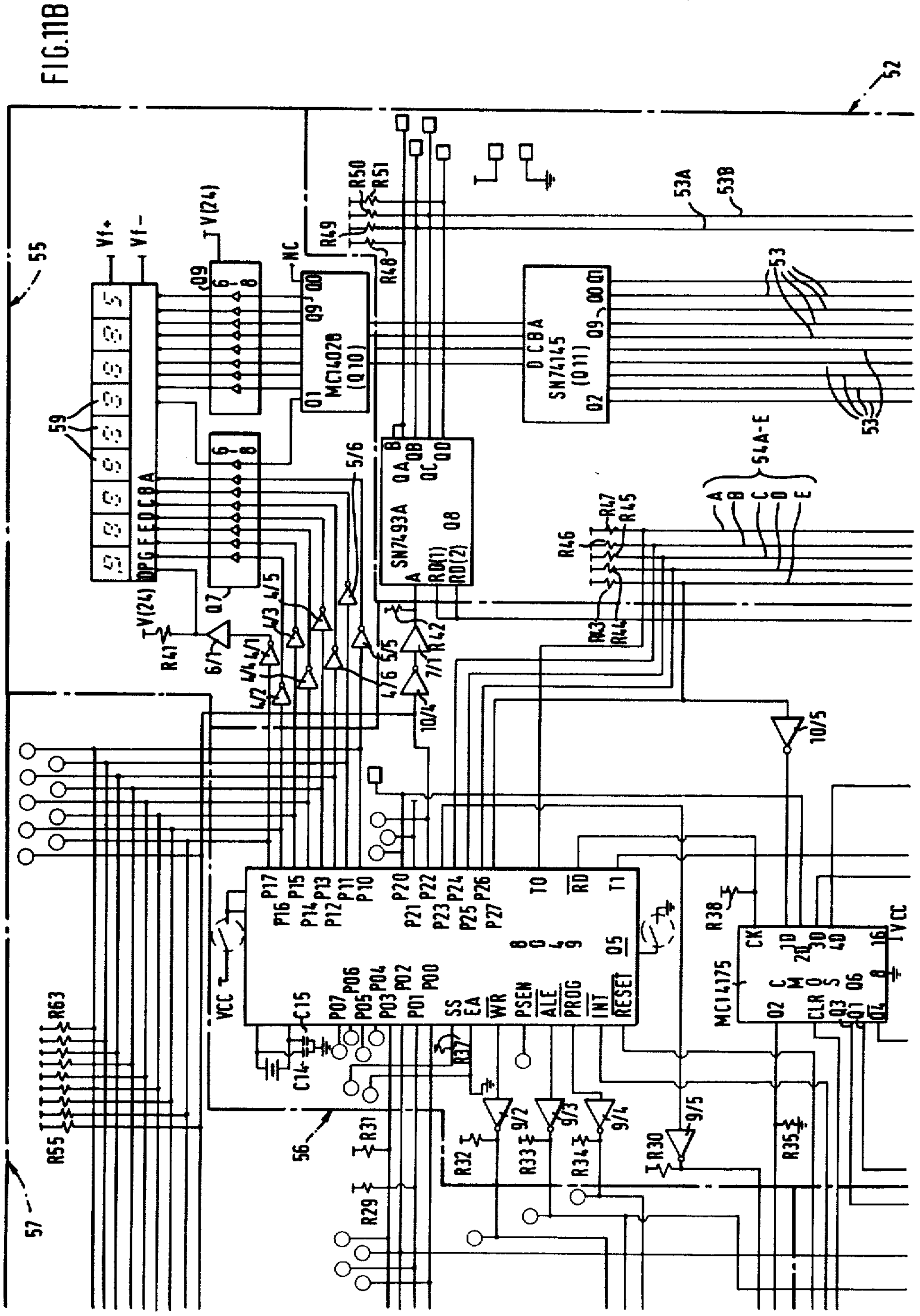
Figure 11C:
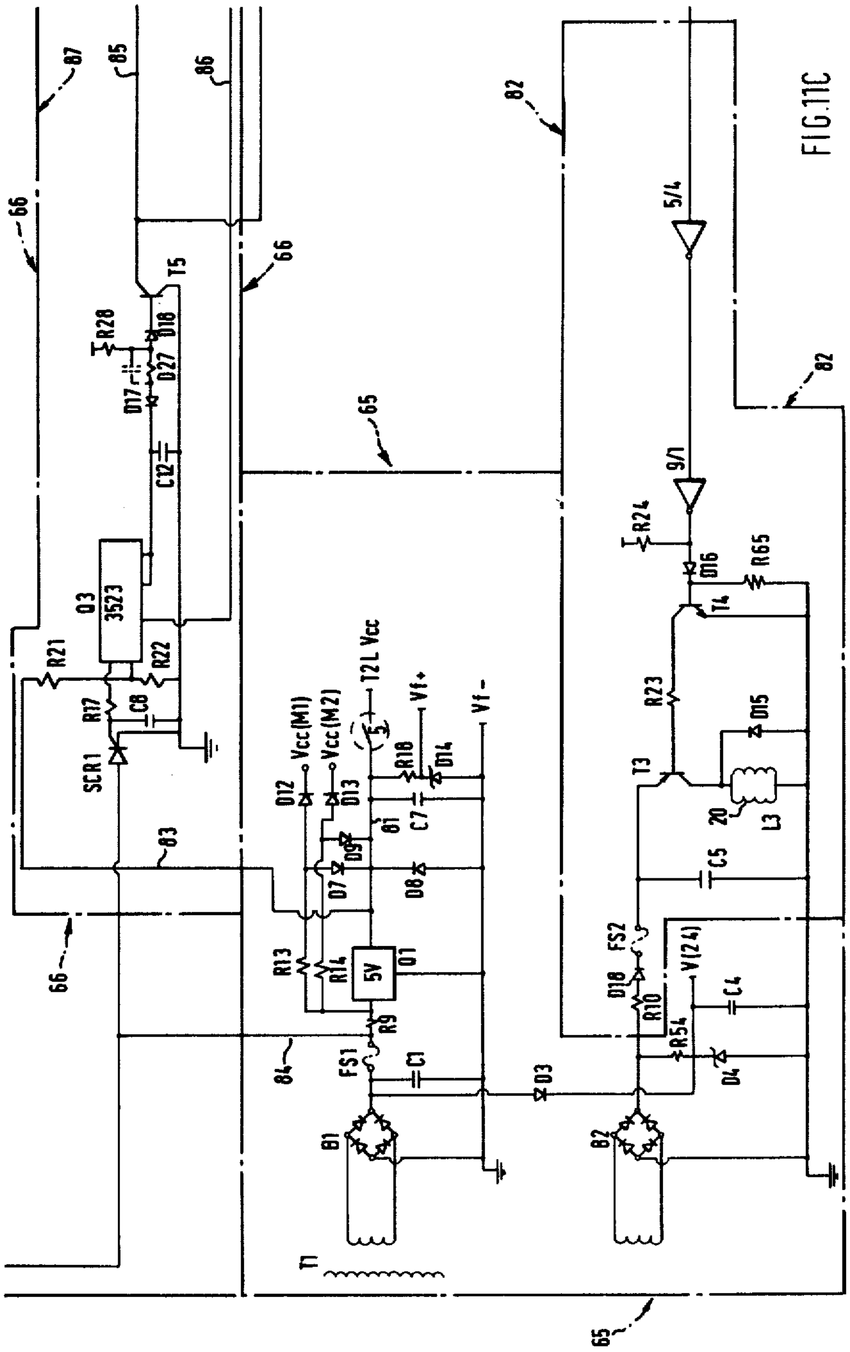
Figure 11D:
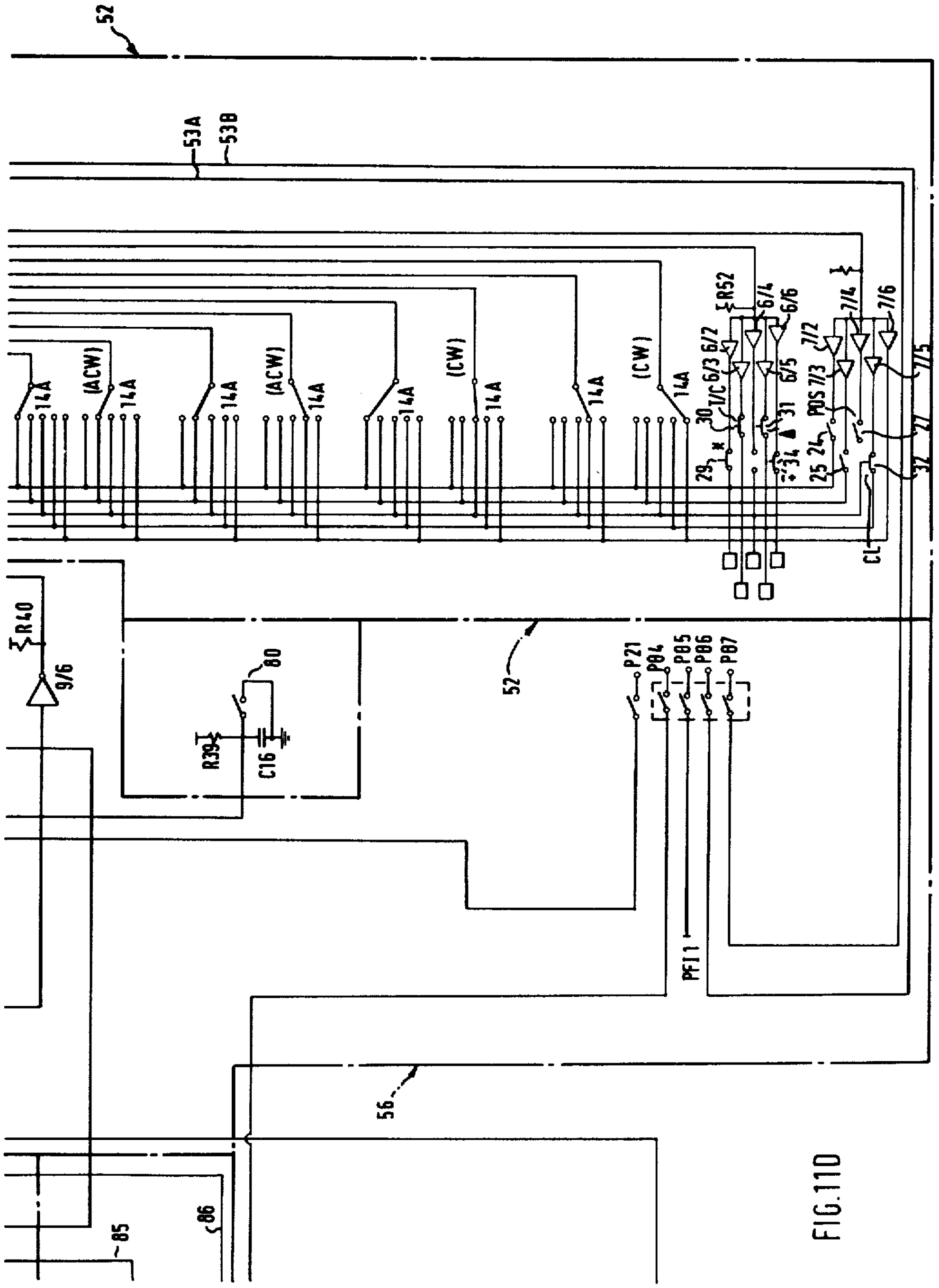

When the thumb wheels are formed with lobes as shown in FIGS. 1, 3 and 10 so that the spaces between the lobes on each wheel correspond to a series of digital values, rotation of any thumb wheel 1 causes a spring loaded locking bar 15 to detent the thumb wheel in each correct value position. As described in the specification of patent application No. 79.03987, rotation of a thumb wheel 1 from one value position to the next forces the locking bar 15 to ride over a lobe and in so doing slides a trip lever isolator unit 16 behind a clutch trip lever 17, thereby inhibiting the operation of a clutch unit 18 until the thumb wheel has reached the next correct value position. Thus a printing cycle cannot take place if any of the value selector wheels 1 is incorrectly positioned. When a printing cycle is committed, the trip lever 17 is positioned so as to hold the isolator unit 16 against movement, thereby effectively locking the thumb wheels.

Figure 6:
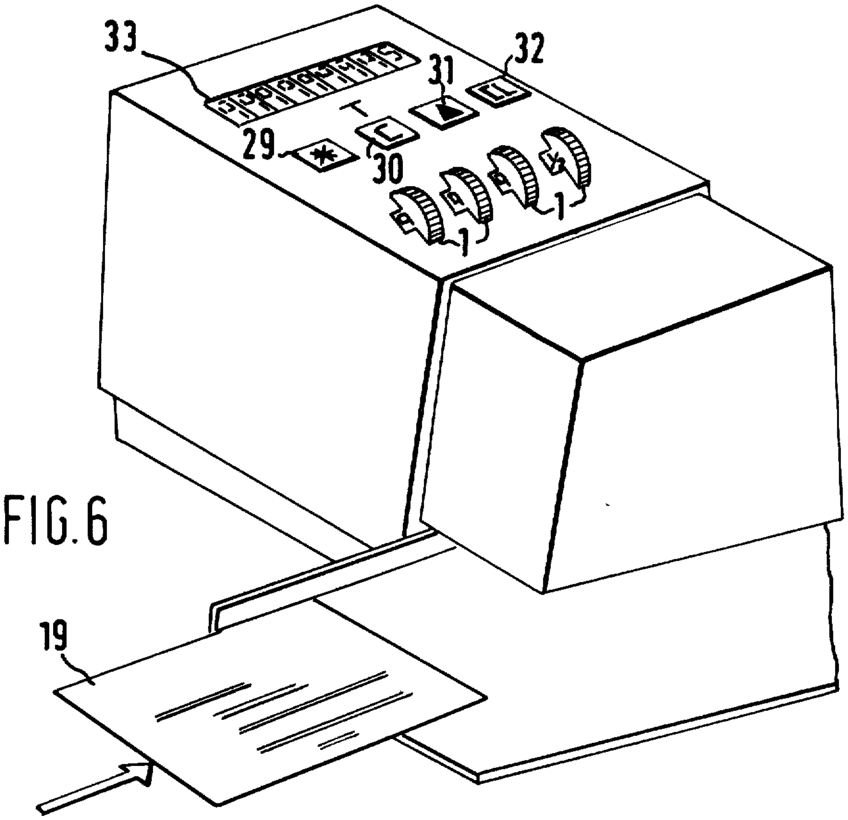
FIGS. 6 and 7 are external perspective views of the franking meter.

A printing cycle is initiated by a signal generated by a switch 80 (FIG. 10) when an item of mail 19 (FIG. 6) is fed into the machine comprising the meter. The signal is fed to a microcomputer which assuming the clear status described below has been verified controls the operation of a trip solenoid 20 (FIG. 1) to swing the trip lever 17 to a position such that a clutch pawl 21 is released to the action of a spring 22 and frees a clutch release plate lobe 23 permitting a motor to drive the arbor 8 and printing drum 13. Simultaneously switches 24, 25 are allowed to open. This action only takes place after the microcomputer control has verified a clear status comprising the availability of sufficient credit and freedom from any fault condition. As the printing cycle is completed, clutch lobe 23 and a clutch lobe 26 return the clutch pawl 21 and trip lever 17 to their initial positions whereby the switches 24, 25 are closed and the printing drum brought to rest.

The switches 24, 25 are microswitches which, on being opened at the beginning of a printing cycle, start an accounting sequence that reads the value set in the encoding switches, adjusts the appropriate registers and reassesses the clear status applicable to the next printing cycle.

Figure 9:
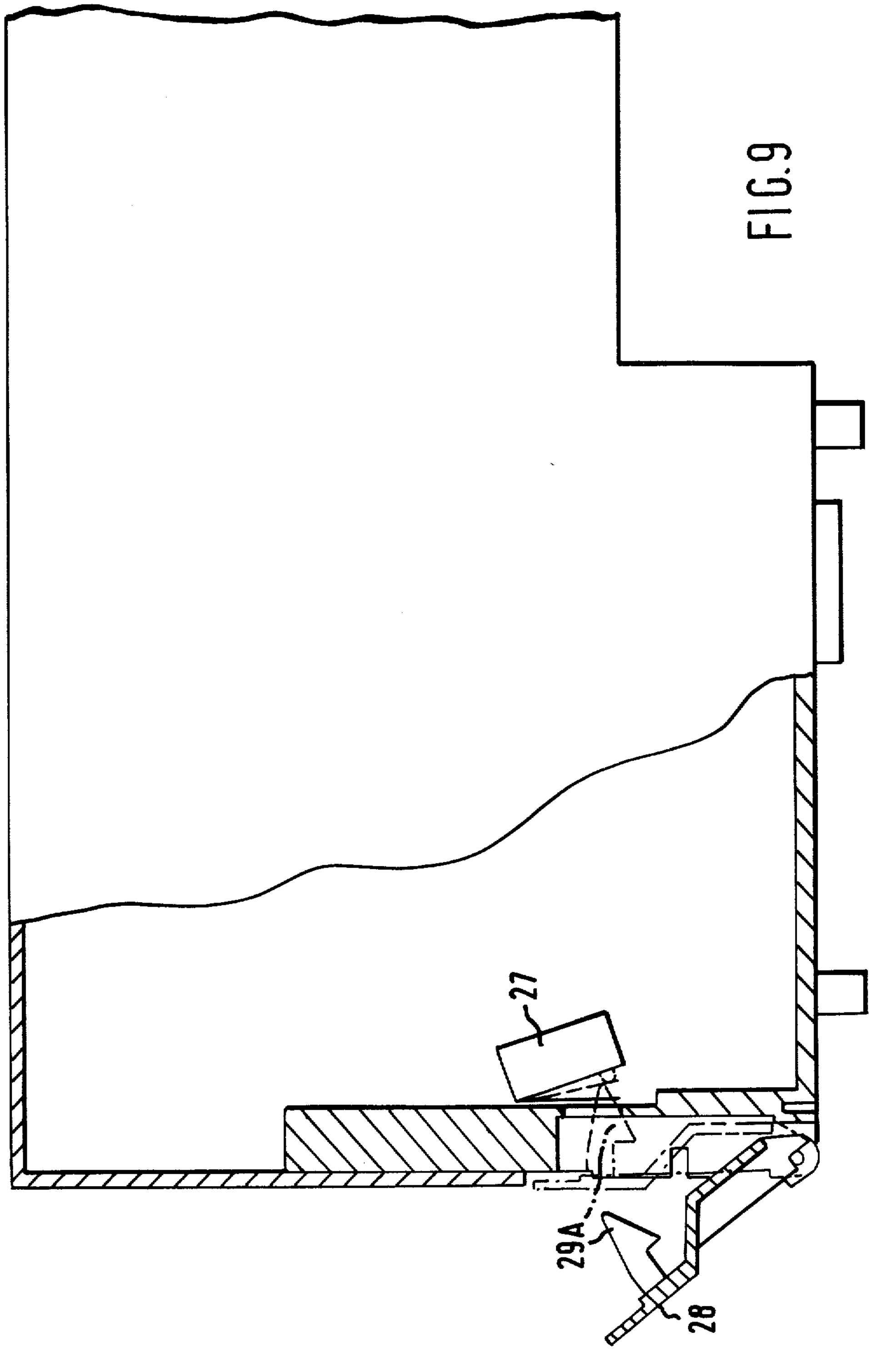
FIG. 9 is a cross-section showing some details of the franking meter.

A third microswitch 27 (FIG. 9) is used for selecting either a customer or a post office mode of operation of the meter. When a hinge door 28 is closed and sealed a projection 29A holds the switch 27 closed to select the customer mode. To convert to the post office mode a security seal is broken and the door 28 opened.

Four push buttons 29, 30, 31, 32 (FIG. 6) are provided. When the machine is set for the customer mode, depression of the button 29 is necessary to print a high value, for example, a value greater than 99½ for the U.K.; this is therefore a safety measure against printing a high value by mistake. The postal value selected appears in a display 33 when the CL button 32 is depressed in the customer mode. The amount in a credit register is displayed when C button 30 is depressed provided this is preceded by depression of the CL button 32. The amount in a tote register of the postage value used is displayed by depression of button 31, then button 30 provided these are preceded by depression of the CL button 32.

The display is arranged to flash at 60 c/min for postal values greater than a predetermined amount and the meter will not operate unless button 29 is depressed while a base trip switch 80 responsive to the insertion of a mail item into the machine is activated. The button 29 must be depressed for each value selected within the high range but for multiple high value operation the button 29 can be held depressed. When the credit available is less than a predetermined value the display shows the letters LC beside the value selected. When a still lower credit is reached the letters LC flash at 30 c/min. When credit has run out the letter C flashes at 60 c/min in each section of the display. In the case of a permanent fault the meter becomes inoperative. However, a display of the amounts in the credit and tote registers can be obtained during a safe fault condition, whilst a service test unit is required to assess information during a catastrophic fault condition.

Figure 8:
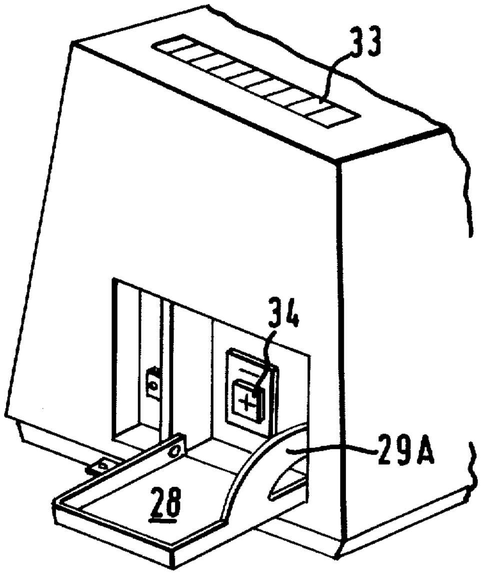
FIG. 8 shows a portion of FIG. 7 with a hinged door opened.

In the post office mode depression of button 29 causes the accumulated number of items franked with a postage value greater than zero to be displayed. To increment the credit, a + button 34 (FIG. 8) is depressed provided this is preceded by depressing the CL button 32, the new credit having been set by the thumb wheels 1. To decrement credit by an amount set by the thumb wheels button 31 is depressed followed by depression of a button 34 (FIG. 8), provided these are preceded by depression of the CL button 32.

Figure 5:
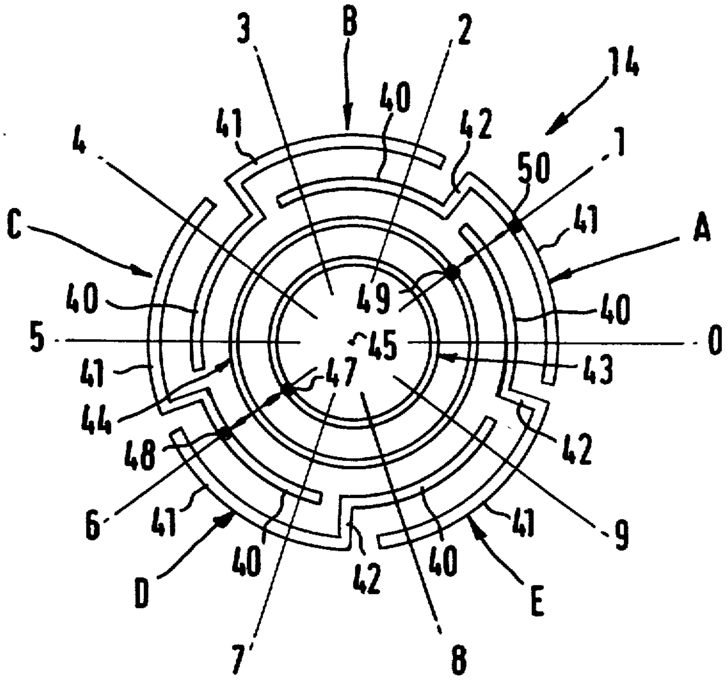
FIG. 5 is a plan view of a stationary part of an encoding switch shown on an enlarged scale.
Figure 5A:
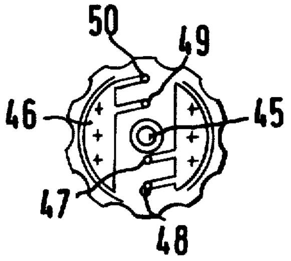
FIG. 5A is a plan view of a rotary part of the encoding switch.

The switch 14 shown in FIG. 5 which is the subject of patent application No. 78.44793 comprises five stationary contact strips A, B, C, D, E each consisting of two arcuate portions 40, 41, joined by a radial portion 42. Each arcuate portion, as well as two common conductor rings 43, 44 are centred on a point 45 and are all on the same printed circuit board. A rotary part 46 (FIGS. 3 and 5A) of the switch has a pair of connected contacts 47, 48 that wipe over the ring 43 and inner arcuate portions 40 and a pair of connected contacts 49, 50 that wipe over the ring 44 and outer arcuate portions 41. As can be seen from FIG. 5 the contacts 47, 48 are diametrically opposite the contacts 49, 50.

The rotary part 46 can be set in any one of ten positions indicated by 0 to 9 in FIG. 5. In FIG. 5 the contacts 49, 50 are shown bridging ring 44 and strip A41; all while contacts 47, 48 bridge ring 43 and strip C40. It will be seen, therefore, that if a circuit is completed through ring 44 and the contact strips A to E are read through one complete cycle, a 5-bit word 00001 is output. Then, if a circuit is completed through ring 43 and the contact strips A to E are read through one complete cycle, a 5-bit word 00100 is output. The words can be combined to give 00101 representing decimal 1. This system can be used to represent all decimal digits 0 to 9 as shown in the following table:

TABLE 1

| | COMMON 44 | | | | | COMMON 43 | | | | | COMBINATION | | | | |
|---|---|---|---|---|---|---|---|---|---|---|---|---|---|---|---|
| DECIMAL | E | D | C | B | A | E | D | C | B | A | E | D | C | B | A |
| 0 | 0 | 0 | 0 | 0 | 1 | 0 | 0 | 0 | 1 | 0 | 0 | 0 | 0 | 1 | 1 |
| 1 | 0 | 0 | 0 | 0 | 1 | 0 | 0 | 1 | 0 | 0 | 0 | 0 | 1 | 0 | 1 |
| 2 | 0 | 0 | 0 | 1 | 0 | 0 | 0 | 1 | 0 | 0 | 0 | 0 | 1 | 1 | 0 |
| 3 | 0 | 0 | 0 | 1 | 0 | 0 | 1 | 0 | 0 | 0 | 0 | 1 | 0 | 1 | 0 |
| 4 | 0 | 0 | 1 | 0 | 0 | 0 | 1 | 0 | 0 | 0 | 0 | 1 | 1 | 0 | 0 |
| 5 | 0 | 0 | 1 | 0 | 0 | 1 | 0 | 0 | 0 | 0 | 1 | 0 | 1 | 0 | 0 |
| 6 | 0 | 1 | 0 | 0 | 0 | 1 | 0 | 0 | 0 | 0 | 1 | 1 | 0 | 0 | 0 |
| 7 | 0 | 1 | 0 | 0 | 0 | 0 | 0 | 0 | 0 | 1 | 0 | 1 | 0 | 0 | 1 |
| 8 | 1 | 0 | 0 | 0 | 0 | 0 | 0 | 0 | 0 | 1 | 1 | 0 | 0 | 0 | 1 |
| 9 | 1 | 0 | 0 | 0 | 0 | 0 | 0 | 0 | 1 | 0 | 1 | 0 | 0 | 1 | 0 |

Accordingly it is necessary for the outputs to pass to a device, such as a microprocessor, capable of recognising the coded information from the switch, determining for security reasons, that there is a single "1" in each word received, and then combining the pairs of words to obtain the required 2 out of 5 code which in turn is recognised as a decimal number.

The four encoding switches 14 are shown in an expanded diagrammatic form in the circuit diagram of FIG. 11 as eight separate 1 out of 5 encoding switches 14A operated in pairs. The encoding switches represented by 14A form part of an input module 52 with which are associated the aforementioned switches 24, 25, 27 fed through buffers 7/2, 7/3, 7/4 (e.g., Ser. No. 7,407), and push button switches 29, 30, 31, 32, 34, fed through buffers 6/2, 6/3, 6/5, 7/5 and 6/6 (e.g., Ser. No. 7,407). All these buffers as well as the inputs to the encoding switches are connected respectively by ten lines 53 to a binary to decimal decoder Q11 (e.g., Ser. No. 7,4145).

A microcomputer Q5 (e.g., 8049) which is provided with a ROM and into which is masked various software instructions, provides the primary control of the operation of the meter. It has a limited number of input lines P24–P27 and To that can read signals from the switches and press buttons associated with the input module 52. The total number of signal outputs from the encoding switches alone exceeds the number of input lines. Therefore, a time division multiplexed (TDM) system is employed in which ten groups of five signals are sampled sequentially along five lines 54A-54E. The TDM scanning is provided by a binary counter Q8 (e.g., Ser. No. 7,493A) and the decoder Q11. The counter Q8 operating under control of signals from line P22 of the microcomputer provides cycles of four inputs through a binary-coded decimal sequence of 0000 to 1001 to the decoder Q11 which produces a logic level "0" on each of the ten output lines 53 in turn as its four inputs cycle through the BCD sequence.

The sequence of cycles of four signals on the four outputs of QA, QB, QC, QD of counter Q8 follows that shown in Table 2 below. It is possible for a microcomputer Q5 to be selected or for the microcomputer Q5 to be adapted for the provision of feedback means comprising lines 53A, 53B described below to enable the microcomputer Q5 to monitor the sequence from scan 2 to scan 9 inclusive.

TABLE 2

| COUNT | QA | QB | QC | QD |
|---|---|---|---|---|
| 0 | 0 | 0 | 0 | 0 |

TABLE 2-continued

| COUNT | QA | QB | QC | QD |
|---|---|---|---|---|
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |

0 = 16

A quadruple D-type flip flop Q6 (e.g., MC 14175) is used as a four bit latch to store logic signals. The microcomputer Q5 counts the number of signals sent through output P22 and after nine transitions initiates signals through line $\overline{RD}$ and output PO2 to latch Q6 which results in logic '0' which appears on line Q4 of latch Q6 which is then transferred onto an inverting buffer 9/6. The inputs of decoder Q11 change to 0000 and the microcomputer Q5 initiates another pulse through $\overline{RD}$ and logic '1' at 4D of latch Q6 to alter the output of inverting buffer 9/6 to permit Q8 to count again.

Several complete scans are performed by the microcomputer Q5 during which the status of all the switches in the input module 52 remain constant before the microcomputer recognises the resulting signals as valid. This guards against transient electrical interference as well as switch bounce.

The microcomputer Q5 interacts with the input module 52 to verify correct scanning sequences and to detect faults on lines; for example, the failure of a scan of one of the encoding switches to include two "1s' (Table 1) or, alternatively, two "0s" according to the arrangement of the logic levels.

A buffer 7/6 shown at the lower right hand corner of FIG. 11 presents the microcomputer with a "0" through line 54E at the beginning of the first scan of a sequence. Failure to do this induces an eventual shutdown of the meter.

Central to the correct functioning of the input module 52 is its interaction with the microcomputer Q5 to verify correct sequence of scanning and to differentiate between fatal and non-fatal faults. Any fault that is non-periodic and intermittent, but does not in any way influence the status of the input variables (i.e., status of the encoding switches 14, status switches 29, 30, 31, 34 and command switches 24, 25, 27, 32) and does not degrade the system performance appreciably, is defined as a non-fatal fault, such as noise spike or switch bounce. A fatal fault renders the meter inoperative.

The detection of fatal faults associated with the input module 52 is achieved by taking feedback connections from outputs $Q_B$ and $Q_C$ of counter Q8 to respective microcomputer inputs PO7 and PO6. After initiating each scan, the microcomputer inputs these feedback states from outputs QB and QC according to Table 2. Coupled with the above fact, is the fact that the mechanical construction of the encoded switches 14 prevents the same output occurring on the same one of the lines 54 A–E in each of the consecutive scans 2-3, 4-5, 6-7 and 8-9 by way of outputs Q2 to Q9 of decoder Q11, so that the microcomputer is enabled to monitor scans from 2 to 9. Although the above statement is true under normal operation, there is still a possibility of mis-reading the encoding switches under certain failures. For example, if the QD output of counter Q8 failed in the "O" state, the normal scan of 10 by the microcomputer Q5 would be allowed to energise the outputs of Q11 in the following order: 0123456701 etc., as compared to the normal order of: 0123456789 etc. It can be clearly seen that this would create a wrong value for the most significant encoded switch, i.e., the encoded switch 14 (lowermost switches 14A in FIG. 11 connected to outputs Q8, Q9) allocated to the thousands order. The status of the groups of switches 29, 30, 31, 34 and 24, 25, 27, 32 would be read as the value for the most significant encoded switch. In order to overcome this possibility of mis-reading, the command and status switches are arranged as shown in FIG. 11.

At scan 0 through Q0 in decoder Q11 the status switches 29, 30, 31, 34 and a deliberate open circuit at buffer 6/4, are sampled which ensures a logic "1" at line 54C. At scan 1 through Q1 in decoder Q11 the command switches 24, 25, 27, 32 and deliberate short circuit at buffer 7/6 are sampled to ensure a logic "0" at line 54E. (This particular short circuit is also used to initiate a trip cycle as described later). This arrangement is such that it produces a 5 bit code that is different to the 5 bit code produced by the encoding switches at all possible combinations of the command and the status switches. By creating this disparity, any misreading is averted and the microcomputer is able to monitor the scans from 0 to 9 successfully and make the meter inoperative in the event of fatal failures in the input module.

It is to be noted that the simultaneous operation of switches 24 and 25, as described above with reference to FIG. 1, the inaccessability of switch 34 in the customer mode, and the fact that switch 34 can only be operated in the post office mode when the switch 27 is open (FIG. 9), combine to produce a reliable input status monitoring system. If the switch 34 was operated when the switch 27 was closed the microcomputer would detect this as a fatal fault.

Description of some common faults and their detection is given below:

If buffer 9/6 fails as to prevent counter, Q8 being reset after scan 9, no deleterious effects follow as the absence of logic "0" at line 54E at scan 1 and the reinitialisation of counter Q8 after scan 15 would be consequently detected and the meter made inoperative.

If the outputs of either counter Q8 or decoder Q11 develop a permanent fault, (either stuck at "0" or stuck at "1") the combination of invalid feedback states from counter Q8 and the appearance of incompatible 5 bit code at lines 54 A–E, are interpreted by the microcomputer as fatal faults and once again the meter is made inoperative.

The afore-mentioned failure detection is also extensively used in production and in field service to pin point components which cause such failures and reduce the mean time to repair.

The primary objective of the time divisional multiplexed scanning system is to replenish peripheral registers in the microcomputer Q5 with current status of input peripheral elements; to provide a high enough sampling rate to differentiate between transitory states of input peripheral elements (e.g., switch-bounce) and stable states; and to provide a scan rate sufficient to produce a flicker-free display in a display module 55.

It is often found in various applications of microcomputers that the input/output capability of the microcomputers is required to be increased. This increase in input/output capability is easily achieved by incorporating devices known as input/output expanders in the system.

Although the embodiment of the franking meter according to the invention shown in the drawings called for more outputs than the microcomputer can provide, this need is successfully met by incorporating the inexpensive quadruple D-type flip-flop Q6 so that the need for the inclusion of an expander is averted. The outputs of latch Q6 are manipulated by creating the desired states at the respective inputs and by the generation of a pulse at $\overline{RD}$ output of the microcomputer. Since pulses are generated at $\overline{RD}$ output of the micro-computer during memory read or port O (see below) input operation, it is important that the microcomputer sets the inputs of latch Q6 at desired states before embarking upon such operations. This can be achieved by making lines 54 A–E in a logic "1" state if necessary and by either setting or re-setting the other inputs to latch Q6.

The microcomputer Q5 and the latch Q6 form part of a processing module 56. The design objectives of the processing module 56 are (see particularly FIG. 10):

1. To process franking data, execute fault tolerant-/safeguard and anti-noise algorithms when required and to do adequate system and self diagnosis;
2. To provide the scanning signals to, and verify the validity of the data from the input module 52;
3. To provide a trip signal via latch Q6 to the trip solenoid 20 to initiate a franking operation;
4. To provide scanning signals and illuminating signals for the display module 55;
5. To provide a signal via latch Q6 to actuate an over-voltage protection and shutdown module 66;
6. To provide signals to read from and write to or render quiescent ultra low power memories Q2 and Q4 in a memory module 57;
7. To sample inputs to verify the correct functioning of all modular parts of the machine.

The memories Q2 (e.g., 6508) and Q4 (e.g., 6508) are written sequentially and can be read either simultaneously or in sequence. The address to the memories Q2, Q4 is written from Port 1 (outputs P10–P17) of the microcomputer and the data from Port 0 (P00–PO3). This greatly reduces the dependance on critical parameters such as the address hold time and the fall time of the $\overline{ALE}$ signal. Since several $\overline{ALE}$ negative transitions may occur before the actual read or write operation of the memory, the probability of incorrect addressing is reduced as well. The address lines are also deliberately made bi-directional as to give the microcomputer more capability of diagnosis as, for example, write then read and verify the address. The memory Q2 is written to through an inverting buffer 9/4 (e.g., LS 7405) and NAND gates 2/1,2/4 (e.g. MC 14093) and buffer 9/3. The memory Q4 is written to through an inverting buffer 9/2, NAND gates 1/1, 1/2 (e.g., MC 14093) and buffer 9/3. The memories Q2 and Q4 are read respectively through DO outputs by synchronising signals at NAND gates 2/1, 2/4, 1/1, 1/2 and buffer 9/3. The second inputs to the NAND gates 1/1, 1/2, 2/1, 2/4 are controlled for effecting the writing and reading operations from a microcomputer output P23 and Q2 output of latch Q6 by way of inverting buffer 9/5 and pairs of inverting gates 1/3, 1/4, and 2/2, 2/3. It will be seen, therefore that the select lines of both memories Q2 and Q4 are derived respectively from different integrated circuit packages namely the latch Q6 and microcomputer Q5, so as to eliminate any indefinite selection of the memories in the event of failure of either Q5 or Q6 and hence the probable destruction of the contents of both memories Q2 and Q4.

In each memory the information is stored as an eight bit word in cells sequentially located. Address lines A0–A8 are common to the memories, and the bits may be stored in identical address locations in each memory. The accounting data consists of only four bits. The remainder are added as part of an error detecting and restoring code. Up to two bits in error can be detected and a single error can be corrected. The specific patterns of bits based on a well known coded system are shown in Table 3 below, whereby four check bits are added to each sequence of data bits so that each such sum will remain different from all the other sums even if its contains two errors.

TABLE 3

| DATA | CHECK |
|---|---|
| 0000 | 1111 |
| 0001 | 0100 |
| 0010 | 0010 |
| 0011 | 1001 |
| 0100 | 0001 |
| 0101 | 1010 |
| 0110 | 1100 |
| 0111 | 0111 |
| 1000 | 1000 |
| 1001 | 0011 |
| 1010 | 0101 |
| 1011 | 1110 |
| 1100 | 0110 |
| 1101 | 1101 |
| 1110 | 1011 |
| 1111 | 0000 |

The microcomputer also utilises superfluous cells in both memories Q2 and Q4 as dummy locations as to perform read, write and verify operations in order to validate the integrity of both memories before embarking upon system read and write operations i.e., up-dating the memories after a trip cycle. This is also a powerful tool for diagnosing certain system failures such as a permanent fault at gates 2/1, 2/4, 1/1 and 1/2.

A further safeguard is provided by a comparison of the data in each memory with that in the microcomputer Q5 during use. At power up a comparison is made between the memories. At power down the microcomputer memory is discarded. However, the data in the memories is made non-volatile in that each memory together with protection control gates has its own long life battery 58 to retain the information when mains power is removed. Decoupling capacitors C9 and C13 are provided and diodes D10 and D19 prevent reverse current flow through the batteries when the main supply is on. Resistors R19, R20, R25, R26 are pull up resistors to ensure a clearly defined logic "1" during power off states. Resistors R29, R31 are pull up resistors to provide logic compatibility between the microcomputer and memories.

The address lines A0–A8 are driven by signals from the microcomputer at its outputs P10–P17. The logic condition of these lines is governed by the microcomputer programme. Data inputs Di for the two memories are taken respectively from microcomputer outputs PO1 and PO3. Data outputs DO are connected respectively to the microcomputer respectively at POO and PO2.

Redundancy is adequately achieved by having all the interconnections from each memory independent of the rest of the system with the exception of the address lines A0–A8. The only probable failures are, therefore, safe failures. All other connections are made completely separate and the susceptible lines such as those connected to the inputs STR and WE are deliberately gated by different packages of gates as indicated above. The failure of an integrated circuit package does not lead to the destruction of both memories. The fact that the WE inputs of the two memories originate from the different outputs $\overline{WR}$ and $\overline{PROG}$ of the microcomputer instead of the more conventional single $\overline{WR}$ output means that data corruption in both memories is prevented in the event of a $\overline{WR}$ output failure. Thus, an unusual way of accessing the memory Q2 is provided. The microcomputer writes to memory Q2 by executing the instructions that would be needed as if it was communicating with an input/output expander. The $\overline{PROG}$ signal generated by this action is gated to produce a WE signal for memory Q2. This also gives the microcomputer more capability for failure analysis under various fault conditions.

The inclusion of the aforementioned method requires another set of instructions in addition to the other set for memory Q4. These two sets are mapped onto two different spaces in the ROM of the microcomputer. This gives additional safeguard against failures such as the failure of the program counter of the microcomputer. By careful choice of memory space and by adequate separation of software modules, an incorrect access to both memories due to microcomputer failure is successfully averted. The software also takes into account, the failure of increment/decrement counter, registers failure, input/output ports failure and general system noise during power up and power down. The packaging is optimised to give the memories adequate protection from airborne radiation and static discharge. The packaging and power supply for the memories is described in greater detail below in relation to a power supply module 65.

The display module 55 includes an alphanumeric display consisting of typically nine blocks 59 of seven segments plus a decimal point. Each segment within a block is a variant of the traditional triode valve. A filament heated cathode provides an electron supply. The electrons are allowed to bombard an anode under control of a biassed grid. The anode comprises a shaped chemical material which fluoresces when the anode is bombarded. The nine blocks of segments are scanned sequentially at a high enough rate to prevent flicker by the action of the counter Q8, the four ouputs QA–QD of which are fed to a low power inverting binary to decimal converter Q10 (e.g., MC 14028). The outputs of the converter Q10 are fed to non-inverting buffers Q7, Q9 (e.g., each UDN-6118). The buffer Q9 enables a 24 volt input to provide sufficient current for the filaments to form a character from the seven anodes in each block 59, synchronously with scanning of the nine blocks of segments. The microcomputer Q5 provides signals through a group of outputs P10–P16 and the buffer Q7 that determine which grids in each block are to cause their anodes to be illuminated. The microcomputer is not capable of driving the buffer Q7 directly and does so by way of buffers 5/5, 5/6 and 4/6–4/2 (e.g., MC 14050). A decimal point, when required, is signalled from output P17 in the microcomputer through inverting buffer 4/1 and a high voltage (24 volt) buffer 6/1 to the blocks of segments.

A power supply module 65 is designed to provide power for the electronic components and electromechanical elements, to provide protection for the electronic components against mains born interference, to provide individual power supplies for the memories and to create evidence should any attempts be made to alter the status of the equipment by indirect electrical means.

In the power supply module 65, a mains transformer T1 has dual secondary windings respectively feeding bridge rectifiers B1, B2. One bridge output is filtered by a large value electrolytic capacitor C1. This reduces the ripple content of bridge B1 output to a semi-conductor regulator Q1 which maintains a +5 volt line 81 to enable the microcomputer to complete its functions immediately following a power down condition. The regulator Q1 is a three terminal device with a heat sink, which has its reference built in. The regulator is supplied through a quick blow fuse FS1 which has a rapid response due to a silicon controlled rectifier SCR1 in the over voltage module 66. Memory supplies VCC (M1) and VCC (M2) are derived through resistors R13, R14 and diodes D7, D9. D8 is a quick response, high energy zener diode with a very large transient power absorption capacity and is used for the protection of line 81 against breakdown of the regulator Q1 prior to the operation of the over voltage protection module 66 (which has a 200 μs delay). Capacitor C7 acts as a filter as a protection element in conjunction with diode D8. The memory supplies are fed through diodes D12 and D13 to prevent the batteries 58 draining when power is off. To the first order, the forward voltage drops of D12, D7 and D13, D9 mutually cancel. The regulation and ripple conditions of the memory supplies are substantially those of line 81. The simple arrangement whereby the zener diode D8 provides filtering for high frequency positive excursions on the +5V supply line and whereby the supplies for memories Q2 and Q4 are derived respectively from diodes D13 and D12, not only provides adequate redundancy of the supplies to the memories, but also prevents SCR latch up effect at memory inputs by ensuring that the input signals do not exceed the memory supplies by more than 0.3 V. In the event of such a latch up as a result of either D12 or D13 failure, the memory integrated circuit can become very hot. For this very reason, as well as to provide dissimilar environments to the memories Q2 and Q4, they are packaged as far apart as the physical constraints allow. The control and data inputs and outputs of memories Q2 and Q4 are laid on a printed circuit board orthogonally to the respective address lines for the memories, and the respective supply lines are made as wide as necessary to reduce cross-talk, general system noise and to comply with proper printed circuit board layout practice.

The anode cathode potential Vf+, Vf− for the display 59 is generated by a conventional resistor zener diode combination R18, D14 across the regulator output. The VCC output of the line 81 supplies logic units and the microcomputer Q5.

The output from the bridge rectifier B2 provides, by way of resistor R54, zener diode D4 and capacitor C4, the 24 volt supplied for the display module 55. A diode D3 is connected from the output of bridge rectifier B1 to the junction of zener diode D4 and resistor R54 so that an abnormal increase in mains supply voltage will cause diode D3 to be destroyed thus providing evidence of the occurrence of this abnormal condition.

The bridge rectifier B2 also supplies a trip module 82 for operating the trip solenoid 20 to initiate the printing operation as described above. A capacitor C5 is used to store the charge to operate the trip solenoid when a transistor T3 switches on. Capacitor C5 is charged via resistor R10 and a slow blow fuse FS2 which isolates the trip solenoid either under the control of the microcomputer due to defined system failures e.g., fault in input module 52, or if the transistor T3 becomes short circuited between collector and emitter.

Transistors T3 and T4 are used to switch the charge stored in capacitor C5 to operate the solenoid 20. The signal for this is delivered by the microcomputer Q5 by way of the latch Q6 when the microcomputer has noted that the input of P27 from line 54E is "0" and has monitored the condition of the two microswitches 24, 25 thereby diagnosing the correct behaviour of the printing drum. The consequent output signal at Q1 on Q6 is "1". This signal is delivered through inverting buffers 5/4, 9/1. A resistor R24 provides current to drive transistor T4 into saturation via diode D16 when inverting buffer 9/1 goes to "1" as this buffer alone does not provide sufficient drive current. When trasistor T4 conducts its collector current, defined by resistor R23 and the base emitter T3, ensures that even with minimum design gain sufficient collector current flows through T3 to operate solenoid 20. The resistor R10 not only limits the charge current of capacitor C5 but also limits the current drawn from bridge B2 when transistor T3 switches on. The diode D16 increases the noise immunity of transistor T4 and resistor R55 provides a discharge path to ground.

The +5 volt supply line 81 is connected by line 83 to a comparator unit Q3 (e.g., MC 3423) consisting of two comparators a constant current source and a 2.6 volt reference. The line 83 is divided by resistors R21 and R22 to provide the input for the first comparator. The input of the second comparator is connected to the current source output of the first comparator and a delay element consisting of a capacitor C12. Normally the first comparator is in the 'on' condition, clamping the constant current source to ground. Consequently the second comparator, which connects the constant current source and reference voltage, is in the 'off' condition. When the line 83 exceeds a specified voltage, the input to the first comparator exceeds 2.6 volts so that it unclamps the constant current source with the result that the capacitor C12, connected between the constant current source and ground, charges until it reaches 2.6 volts whereupon the second comparator switches SCR1 via R17. Therefore, upon firing the silicon controlled rectifier causes the line 84 to conduct and blow the fuse FS1. The constant current, the 2.6 volt threshold of the second comparator, and capacitor C12 produces a delay of 200 μs before the second comparator changes state. Therefore, the output from the rectifier B1 is short circuited and regulator Q1 is cut off if the voltage of the line 81 exceeds a certain value for longer than a predetermined time.

The first comparator in the unit Q3 is arranged to drain current through diode D17 and resistors R27 and R28 so that normally the voltage across a diode D18 and the base/emitter junction of a transistor T5 is not sufficient to turn T5 on. However, when the capacitor C12 charges the potential across D18 and T5 rises until it is sufficient to turn transistor T5 on. Thereby line 85 is rendered conductive and the NAND gates 2/1 and 1/1 ensuring the master control of the memories are shut down. Therefore, the memory data is protected before the power supply is interrupted by blowing fuse FS1.

The power supply to the regulator Q1 can also be cut off by the microcomputer Q5 acting through the latch Q6 and a connection 86 between Q3 output of Q6 and the device Q3.

A power fail/reset module 87 is provided to ensure that the microcomputer and memories operate safely during the appearance and disappearance of power and also to provide an advanced signal to the processing module 56 ensuring the correct sequence of events if there is a mains power failure.

Redundancy of the circuit elements is provided to ensure that a single component failure within the module 87 does not prevent correct failure signal generation. Thus the line 84 from the power supply module 65 is connected to zener diodes D1, D2 in parallel to provide current to bias respective transistors T1, T2 into saturation. The bias current of D1 (D2) creates a voltage across resistor R1 (R2) to provide a base current for T1 (T2) via resistor R3 (R4) which protects the transistors from excessive drive. These diodes and resistors are chosen to ensure saturation of T1 (T2) under all normal power up conditions. A "0" at the collector of T1 (T2) is converted to a "1" in a low power inverting buffer 10/1 (5/1). The outputs of these two buffers are combined in a NAND gate 11/1 to interrupt the microcomputer action at port $\overline{\text{INT}}$ by way of an inverting buffer 10/2.

The output of 10/1 (5/1) is connected via resistors R7, R11 (R8, R12), diode D5 (D6) and capacitor C2 (C3) to one input of NAND gate 11/2 (11/3). This is a Schmitt trigger NAND gate that ensures that slow changes on its inputs produce fast clear transitions on its output. When the output of buffer 10/1 (5/1) changes from "0" to "1" at power up, C2 (C3) changes via R7, R11, (R8, R12) until the threshold of gate 11/2 (11/3). The output of 11/2 then changes from "1" to "0" because its other input is held by resistor R15 to the +5 line voltage at "1". The transition of 11/2 from "1" to "0" allows capacitor C2 to discharge via resistor R7 and diode D5 until the low threshold is reached and the output of gate 11/2 alters from "0" to "1". The discharge time of C2 is thus quicker than its charge time. The output of gate 11/2 is inverted in an inverting buffer 5/2 to produce the "1" level for X microseconds after power up and the "0" level Y microseconds after power down. The output of the inverting buffer 5/2 provides the other input to the gate 11/3 which does not change state until both inputs are at "1" so that it is the slower of the two timing circuits R11, D5, C2 and R12, D6 C3 that is dominant at power up. This differs from the power down condition when it is the timing circuit that discharges faster than controls gate 11/3. The output of gate 11/3 is inverted by an inverting buffer 10/3 which feeds, on the one hand, a low pass filter and on the other hand, another gate combination 11/4, 5/3. The signal from gate 5/3 goes to an input CLR to clear the latch Q6.

The low pass filter comprises capacitors C6, C10, C11, inductors L1, L2, resistor R16 and diode D11 and its output is connected to the reset input $\overline{\text{RESET}}$ of the microcomputer. Clearly there is a predetermined delay between the interrupt signal through buffer 10/2 and the clear and reset signals through buffer 10/3. The primary purpose of the filter is to remove any spurious transitions from gate 11/3 or 10/3 that may occur as the +5 volt supply to the system rises to its normal operating level. The danger of a false reset signal arising prior to an interrupt signal is avoided. The filter also provides good filtering of general system noise, "cross-talk" and radiated bursts of noise at higher frequencies.

The input of gate 11/2 connected to R15 also provides a convenient point to produce a reset signal during fault finding or servicing without having to switch off the meter.

The power fail/reset module also provides adequate component failure detection, thus ensuring a complete shutdown of the meter to protect the memories. This is achieved by a combination of circuit design, with the utilisation of few locations in the memories to store component dependent timing flags, and by the execution of a fault tolerant/safeguard algorithm by the microcomputer.

In general, the redundancy of the circuit elements is provided to ensure that a single component failure either does not prevent the emergence of the correct failure signal $\overline{INT}$ at switch off, or does not prevent the generation of the $\overline{RESET}$ signal during switch on and switch off. There are some failures which may disable the microcomputer and the memories indefinitely but since these failures are not in anyway deleterious to the contents of the memories, they are considered as safe failures.

As in the memory modules, the gates of different packages are arranged in such a way that a failure of a single gate or failure of a complete package does not produce deleterious effects. The timing flags assigned to combinations of components such as R7, R11, D5 and C2, along with other variant flags, are stored in the nonvolatile memories Q2, Q4 before shipment of the meter. These flags are received by the microcomputer at switch on and compared with the flags stored in the ROM and any mix-match is interpreted as a failure. If there are no failures, the flags are negated and written back to the memories. At switch off, the time between the emergence of a power failure signal at the $\overline{INT}$ input of the microcomputer and a $\overline{RESET}$ signal at the $\overline{RESET}$ input of the microcomputer is divided into segments assigned to the aforementioned flags respectively. At switch off, these time segments are simulated inside the microcomputer by the timer/counter in the microcomputer and generate an alarm inside the microcomputer after the elapse of each time segment.

When there are no faults and when power is switched off, the microcomputer, after elapse of each time segment, re-negates the assigned flags in the memories to their true states. It is, therefore, clear that the premature emergence of the $\overline{RESET}$ signal would have prevented the microcomputer from re-negating one or more of the aforementioned flags. Thus the un-modified flags would be detected at switch on and interpreted as failures and necessary action taken by the microcomputer. The absence of the $\overline{RESET}$ signal after a predetermined time is also interpreted as a failure.

The component values of R7, R11, C2, R8, R12 and C3 are selected such that they provide a temporary cushioning effect under some failure conditions, i.e., the microcomputer and the memories are initialised safely even if there are some multiple failures such as D5 and D6 becoming short circuited.

To enhance the failure detection, an additional output feeds into the microcomputer at PO5. This line has its' origins at gate 11/1 and enables the microcomputer to do adequate diagnosis. The diagnosis relies on the fact that failures of any component such as T1, T2, D1, D2, 10/1 5/1, 11/1 and, to some extent the failures of R1, R3, R5, R2, R6 would manifest as a fault at the output of 11/1. The output state of gate 11/1 has a different significance at various time frames during system operation. i.e., power-up, power-on and power-down. Any anomaly is again interpreted as failure of the module, for example if the microcomputer continuously sampled a logic "1" at PO5, but both $\overline{INT}$ and $\overline{RESET}$ were absent for a predetermined time.

It will be seen that FIG. 11, in addition to circles shown connected to various lines in the circuit which indicate memory and service interface test points, there are rectangles representing electronic weigh scale interface connections, and a number of broken circles which represent switches, for circuit isolation during fault diagnosis. Each memory Q2 or Q4 is provided with an interface connector to enable diagnostic equipment to be connected for direct interrogation during a fault state or for diagnostic purposes.

Figure 4:
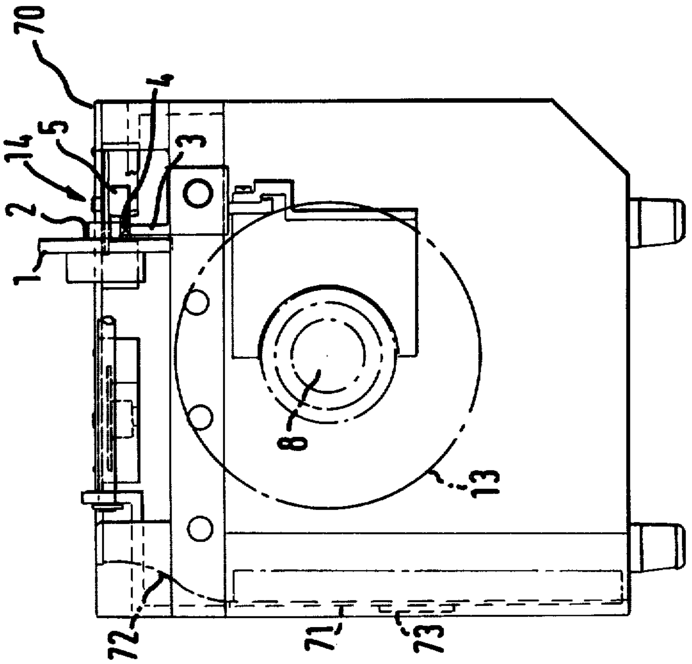
FIG. 4 is an elevation of the franking meter as viewed in the direction of the arrow A in FIG. 3.

An important feature of the solid state circuitry shown in FIG. 11 is that it can all be incorporated on one printed circuit board but a preferred solution is to use two printed circuit boards 70, 71 as shown in FIGS. 3 and 4 located on top and on one side of the meter where they are readily accessible and occupy very little space. The two printed circuit boards are joined by conductor 72 that may be provided by a flexible printed circuit board or some other connecting means. This particularly neat arrangement is primarily due to the fact that the contact strips of the encoding switches are integral with the printed circuit board 70 and the rotary parts 46 of these switches are rotatably mounted directly on the board 70. This printed circuit board also carries the push buttons 29 to 32, the alphanumeric display and the associated solid state units while the board 71 carries the microcomputer, memories and associated solid state units.

A socket 73 is provided for external access to the electronic system and a socket 74 is provided for mounting the franking meter on the base of the machine which carries the means for transporting and controlling the items of mail to be franked.

Turning now to what may be described as the software side of the system, so that the actual organisation of the system can be appreciated, the microcomputer Q5 has a ROM that incorporates meter software modules that maintain the various working registers which are mainly relevant to the timing aspects of the information gathering and output. The remainder of the ROM maintains information which collectively describes the total system status. Within the system status a distinction can be made between the metering status and peripheral status.

The metering status is maintained by registering information contained in a RAM of the microcomputer Q5 pertaining to the monetary standing of the customer, e.g., credit, postal value used, number of mail items franked, as well as the meter's integrity, e.g., fault conditions. This information is copied into the RAMs Q2 and Q4. The peripheral status is concerned with the communications link between operator and machine which depends on the thumb wheels, push buttons and the display. The contents of the peripheral status registers in the microcomputer provide an interpretation of these peripherals at any instant. Since change of status of these peripherals is unpredictable from the point of view of the microcomputer, this interpretation is the result of continuous scanning.

Figure 16:
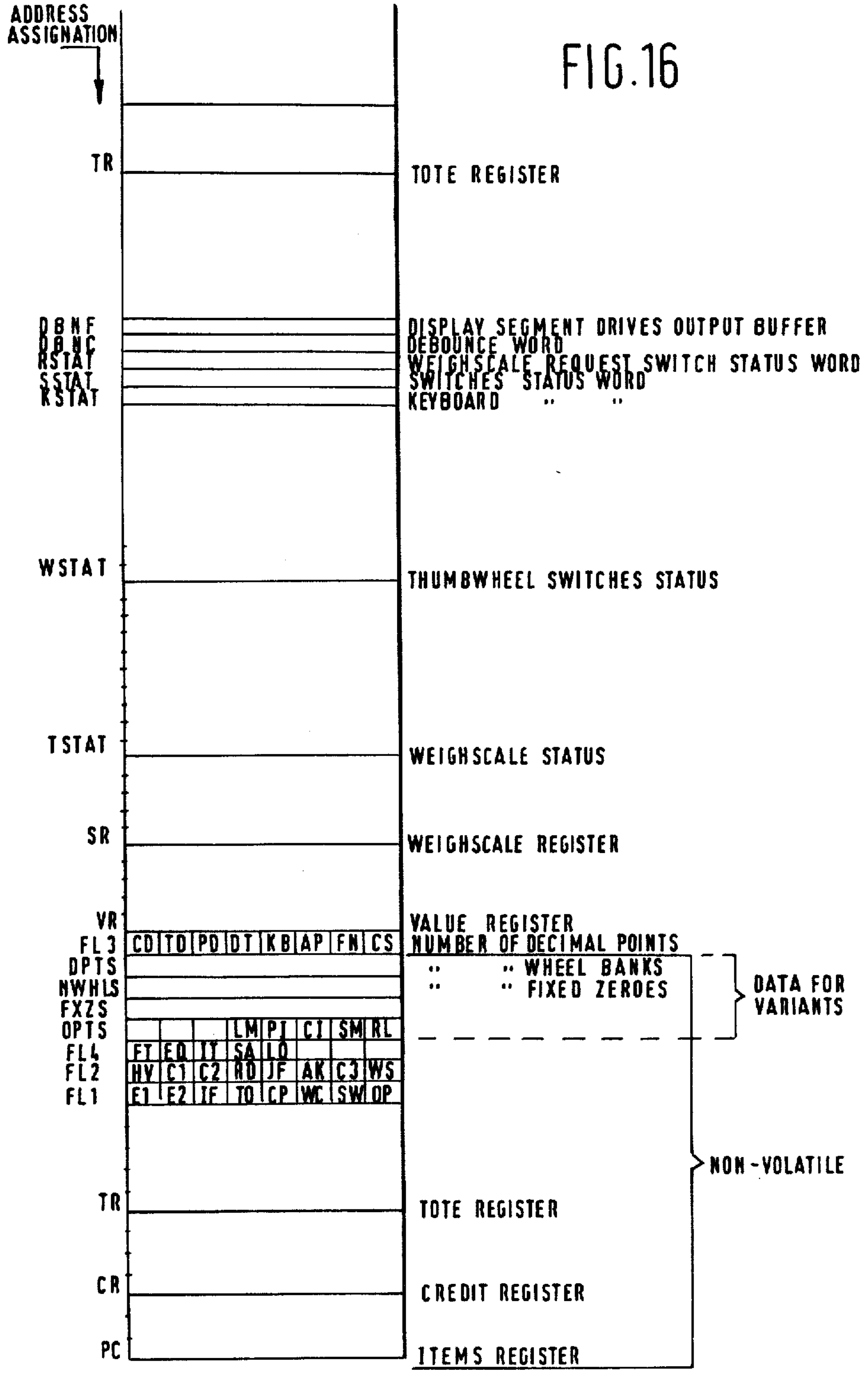
FIG. 16 is a microcomputer data memory map.

Decisions pertinent to the meter functioning are based primarily on the information in the peripheral status registers and also on the status of flags in a flag bank shown in tubular form in FIG. 15. The software reacts instantaneously to changes in peripheral status, whereas a flag is considered only when a go/no go situation arises. A map of the flags and other areas of the microcomputer appears in FIG. 16.

Figure 12:
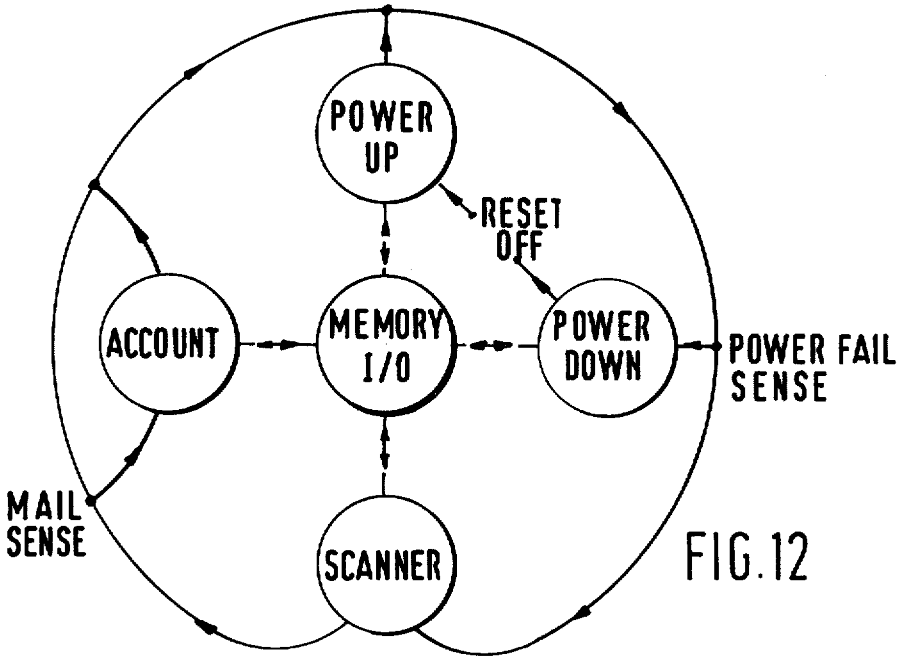
FIG. 12 is a real time diagram relating to certain meter functions.
Figure 7:
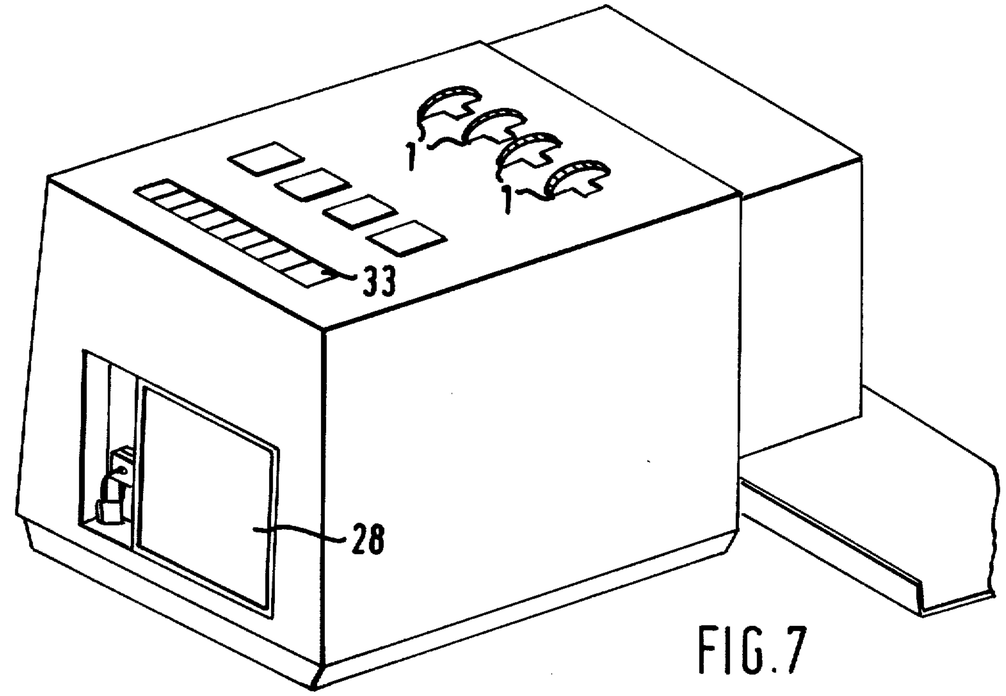
Figure 13:
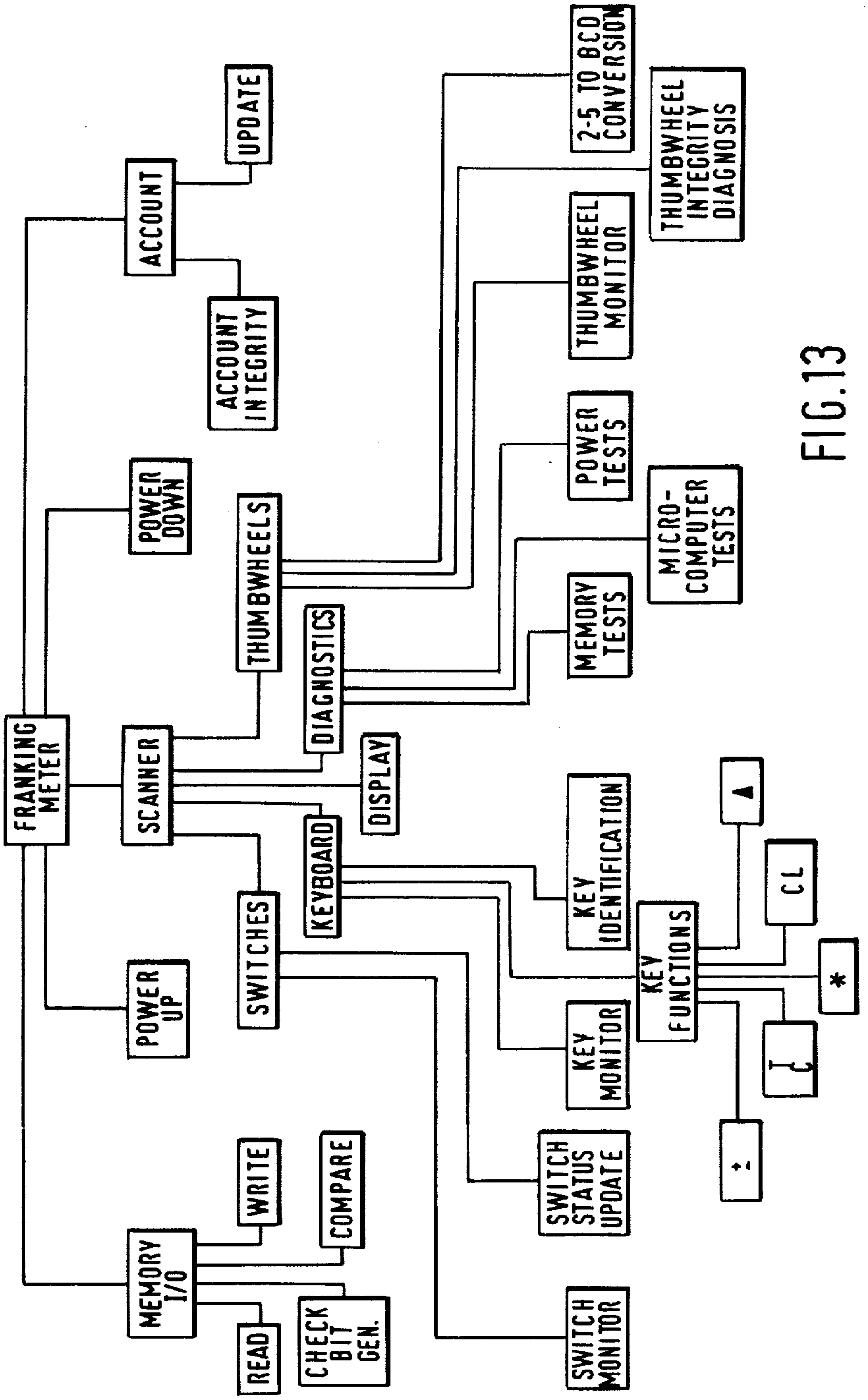
FIG. 13 is a block diagram showing an arrangement of software modules determining the operation and testing of the meter.

The software hierarchy is shown in FIG. 13 which shows there are five main modules. The real time relationship between these is shown diagrammatically in FIG. 12. Here the arrows indicate the direction of progression rather than time flow. Progression around arrowed lines is considered to occur in zero time.

Referring to FIG. 12, the "power-up module" restores the metering status in the microcomputer to that which existed just prior to the last power down, i.e., the input from the battery maintained memories.

Figure 14:
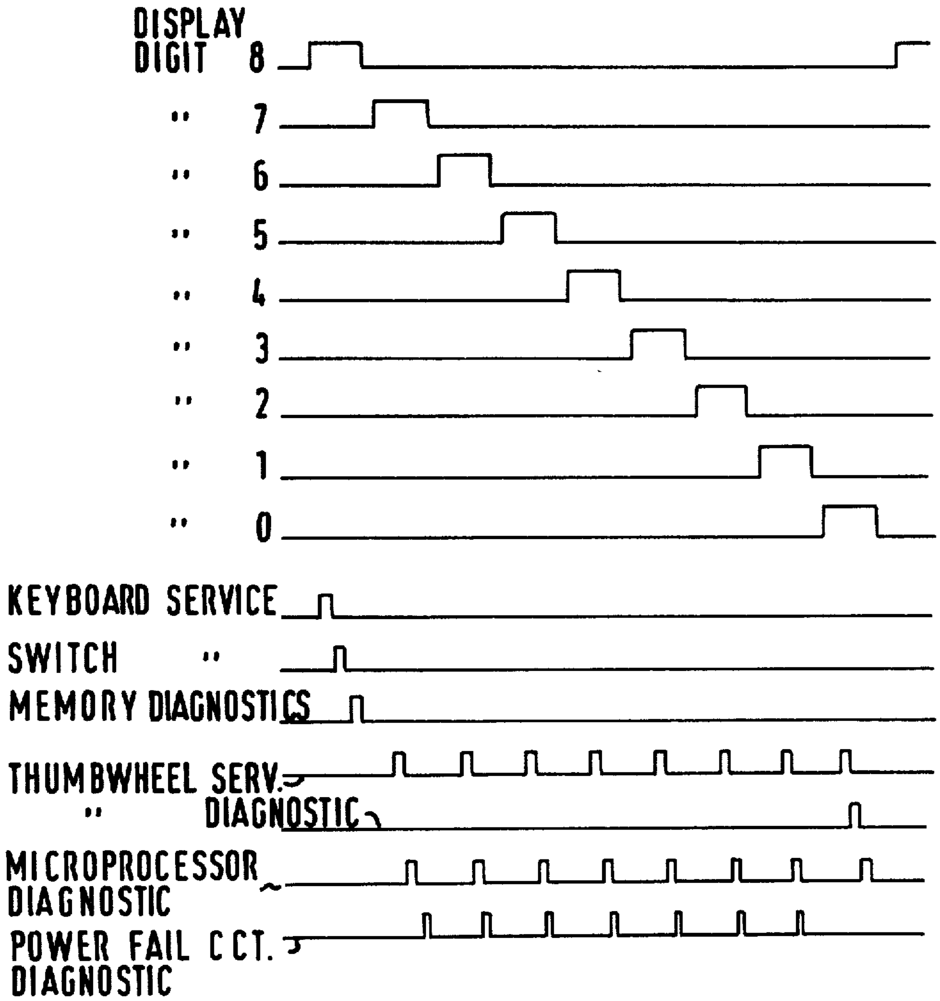
FIG. 14 is a timing diagram relating functions of the meter.

The "scanner module" gathers information from the peripheral systems and outputs status information to the display. This module primarily maintains the peripheral status registers and performs diagnostic operations. Timing aspects of the scanner module are indicated in FIG. 14.

The "account module" controls the input to and output from the metering status whilst also maintaining records pertinent to the customer's account history.

The "memory input/output module" controls transfer of data between the microcomputer data memory and the external support memories Q2 and Q4.

The "power down module" ensures that the metering status, as it was just before a power failure being anticipated, is properly stored in the support memories Q2 and Q4.

Diagnostic routines operate continuously during power on within the scanner module to protect the metering status against pollution and accounting error. For the support memory, the diagnostic is effected by data coding techniques involving the addition of checking bits and also upon comparison operations with the microcomputer's data memory. The check bits are removed upon memory read and are such that at least 3-bit errors are required within a word to have a chance of degenerating into another valid word. In the comparison check each support memory is independently comparable with the microcomputer data memory.

The thumb wheel diagnostic relies for its integrity upon the encoding switches described above. The software distinguishes between invalid codes which are non-fatal (e.g. intermediate wheel positions) and those which are fatal (e.g., short or open circuits). Non-fatal codes inhibit the franking cycle without causing the meter to enter a "fault" mode as would a fatal code.

The diagnostic performs a checksum calculation on the microcomputer's programme memory and in addition does test arithmetic calculations that emulate those performed during a franking cycle account.

The power fail circuit diagnostic makes use of the power status inputs to confirm, or otherwise, the power on or power fail condition.

We claim:

1. A postal franking meter for a franking machine comprising an electronic accounting system and a mechanical printing system together with means for simultaneously setting them including a plurality of printing members allocated respectively to the numerical orders of the maximum value to be franked by the machine, each printing member being adjustable for printing any one of a series of rational numbers, elements respectively mechanically connected to said printing members for setting said printing members to print required values, a printing circuit board assembly comprising at least one printed circuit board, a plurality of switch arrays each consisting of five stationary switch conductors each printed in said printed circuit board assembly and comprising two electrically connected portions respectively allocated to two 1 out of 5 binary codes for an associated decimal digit to be printed, a plurality of contact units respectively connected for setting by said elements and allocated respectively to said switch arrays and rotatably mounted on said printed circuit board assembly for selecting two 5-bit words from each said array, a microcomputer mounted in said printed circuit board assembly, five inputs printed in said printed circuit board assembly and respectively connecting said microcomputer to all of said stationary switch conductors in each said array, said microcomputer being operative electronically to scan in successive cycles each array of stationary switch conductors, each array having a pair of contacts in succession as selected by the associated one of said contact units, said microcomputer being further operative to combine the two five-bit words thus obtained to provide a decimal digit to be expressed by the microcomputer in four-bit binary coded decimal notation and associated with four check bits to give an eight-bit word with high immunity from error, duplicate random access memories mounted in said printed circuit board assembly, writing means incorporated with said microcomputer and connected in said printed circuit board assembly to enter into inputs of said duplicate random access memories said eight-bit words as well as said values received by said computer through said five inputs, said computer being organized for each franking operation of the meter to update said memories and compare the values registered in said memories as a check to their status, a seven segment electrically activated display module mounted in said printed circuit board assembly, means in said printed circuit board assembly interconnecting said display module and said duplicate memories and said microcomputer whereby said module can display values depending on the decimal digits provided by said microcomputer, individual scanning lines printed in said assembly connected in individual pairs respectively to said rotatable contact units, the arrangement being such that the total number of said scanning lines is ten, a binary to decimal decoder in said printed circuit board assembly connected to said scanning lines, a binary counter in said printed circuit board assembly interposed between said microcomputer and said binary to decimal decoder whereby said decoder is controlled by said microprocessor to deliver two successive signals to said rotary contact units in turn thereby scanning said rotary units in sequence, push button operated switches connected to said microcomputer by way of selected ones of said scanning lines for controlling the display of information in said display module including information stored in said memories and an electrical power distribution network incorporated in said printed circuit board assembly for supply of power to said microcomputer, said memories and said display module, said distribution network being adapted for connection to a power source external to said printed circuit board assembly.

2. A franking meter according to claim 1, in which said microcomputer is organized to verify a clear status comprising availability of sufficient credit and freedom from any fault condition prior to operation of said printing members to print a selected value.

3. A franking meter according to claim 2, comprising means for signalling to said microcomputer the introduction of an item of mail into a franking machine carrying the meter, said microcomputer being arranged thereupon to initiate a printing cycle and start an accounting sequence including reading a value set in the encoding switches comprising said arrays and rotatable units, adjusting registers of credit remaining and postage value used and reassessing the clear status applicable to the next printing cycle.

4. A franking meter according to claim 1, comprising a casing including a door arranged to be sealed by a post office authority and containing said printed said printed circuit board assembly and mechanical means connecting said manually operable members to said rotatable switch units and to said printing members, said casing when sealed serving to prevent unauthorised tampering with the accounting and printing action of the machine, the meter further including a switch located in said casing adjacent said door and means automatically operable on opening said door to actuate said lastmentioned switch, and means operable by said lastmentioned switch, when actuated, for changing the mode of action of the meter to a post office mode enabling a postal authority to amend the credit registered, and at least one press button exposed by opening said door being connected to said microcomputer for conditioning said microcomputer to amend the credit registered by amounts set by said manually operable members.

5. A franking meter according to claim 1, including a casing enveloping the top and sides of said meter, said printed circuit board assembly comprising only two printed circuit boards joined by flexible conductors, one said board extending over the top of said meter within said casing and the other said board extending over one side of the meter within said casing.

6. A franking meter according to claim 5, comprising switches operable by push buttons on said top printed circuit board, said stationary contact arrays, said rotatable switch units and said alphanumeric display module also being mounted on said top printed circuit board while said memories and said microcomputer are mounted on said side printed circuit board.

7. A franking meter according to claim 1, in which said push button operated switches comprise a group of four switches respectively connected to four of said scanning lines, said meter comprising means providing a short circuit connection between a fifth of said scanning lines and the scanning lines individual to said croup to provide an encoded output from said four switches different from any encoded output available from said switch arrays.

8. A franking meter according to claim 7, comprising a further group of four switches respectively connected to four of said scanning lines, an open circuit being provided between a fifth of said scanning lines and the scanning lines individual to said group to provide an encoded output from said four further switches different from any encoded output available from said switch arrays.

9. A franking meter according to claim 1, comprising common address lines driven by said microcomputer for said memories, extensions of said address lines for operating said display module, buffers interposed respectively in said display lines, independent data input lines for said two memories, independent data output lines for said two memories and control connections enabling data to be written into and read from said memories by way of said microcomputer.

10. A franking meter according to claim 9, in which said memories, said address lines and said microcomputer provide bi-directional signals along said address lines.

11. A franking meter according to claim 9, comprising two control gates respectively for initiating access to an associated one of said memories, a latch controlled by said microcomputer, one said gate being operated from said microcomputer and the other one of said gates being operated from said latch.

12. A franking meter according to claim 9, in which each said memory includes memory cells to be used as dummy locations for performing test operations for validating the integrity of both memories before up-dating the memories and for general system diagnosis.

13. A franking meter according to claim 9, comprising write control connections respectively to said two memories from different outputs of said microcomputer, thereby preventing data corruption in both memories, said microcomputer comprising a read-only memory and instructions for the generation of control signals for said two outputs being mapped onto two different spaces in said read-only memory.

14. A franking meter according to claim 9, in which said data input and output lines are laid orthogonally to said address lines on a printed circuit board and said memories are each packaged and located apart on said board.

15. A franking meter according to claim 1, including a power fail/reset module having redundant circuit elements connected so that failure of one of said redundant elements fails to prevent appropriate generation of interrupt and reset signals at the microcomputer in association with interrupt and supply of power to the meter, said non-volatile memories having timing flags, associated with combinations of said circuit elements and said microcomputer having a read-only memory containing timing flags, said timing flags in said non-volatile memory being comparable at the initiation of supply of power with said timing flags in said read-only memory, such that mis-match is interpreted as a failure, the flags being negated at various time frames after interruption of supply of power.

16. A franking meter according to claim 15, in which said power fail/reset module provides an additional output for delivering signals dependent upon the state of components in pairs of said redundant circuit elements, the meter including a gate at said output which is connected to said microcomputer and which has an output state that differs at differing time frames during the operation of the meter, any anomaly being interpreted in the microcomputer as a particular failure of the module.

17. A franking meter according to claim 1, comprising a multiple input D-type flip-flop connected to be manipulated by creating desired states at its respective inputs and by the generation of a pulse at an output of said microcomputer, thereby increasing the input/output capability of said microcomputer.

18. A franking meter according to claim 1, in which said power distribution network comprises one voltage regulator, and independent memory supplies with single fault isolation respectively for said duplicate memories, said supplies being derived from said one voltage regulator, further logic elements connected to be supplied by said voltage regulator, said logic elements being arranged to avoid the creation of any SCR latch-up effect in the input circuits of said memories.

19. A franking meter according to claim 1, in which said power distribution network comprises an input circuit for connection to an external mains supply and comprising a first point where voltage varies in proportion to mains voltage and a second point where voltage is stabilised, and a diode connected between said two points and such that it will be destroyed when overloaded by an abnormal increase in the mains voltage thus providing evidence of this abnormal condition.

20. A franking meter according to claim 15 provided with means whereby a reset signal is given to the microcomputer only when the mains voltage exceeds a certain threshold level, and whereby if after exceeding the said level and achieving a normal operating condition the mains supply falls below the said level, a power fail condition exists leading to the franking meter becoming inoperable.

21. A franking meter according to claim 1, including betteries respectively for supporting said memories, a fuse connected to protect said memories and batteries from over voltage, an over voltage protection module for interrupting the power supply to the meter in the event of an over voltage and for fusing said fuse prior to the interruption of the power supply thereby protecting said memories.

* * * * *